(12) United States Patent
Hsiao et al.

(10) Patent No.: US 8,949,233 B2
(45) Date of Patent: Feb. 3, 2015

(54) ADAPTIVE KNOWLEDGE PLATFORM

(75) Inventors: Ruey-Lung Hsiao, Los Angeles, CA (US); Eugene Shirley, Los Angeles, CA (US)

(73) Assignee: Alexandria Investment Research and Technology, Inc., Los Angeles, CA (US)

( * ) Notice: Subject to any disclaimer, the term of this patent is extended or adjusted under 35 U.S.C. 154(b) by 444 days.

(21) Appl. No.: 12/989,756

(22) PCT Filed: Apr. 28, 2009

(86) PCT No.: PCT/US2009/041909
§ 371 (c)(1),
(2), (4) Date: Mar. 8, 2011

(87) PCT Pub. No.: WO2009/134755
PCT Pub. Date: Nov. 5, 2009

(65) Prior Publication Data
US 2011/0264649 A1  Oct. 27, 2011

Related U.S. Application Data

(60) Provisional application No. 61/048,501, filed on Apr. 28, 2008.

(51) Int. Cl.
| G06F 7/00 | (2006.01) |
| G06F 17/00 | (2006.01) |
| G06N 5/02 | (2006.01) |
| H04W 4/18 | (2009.01) |

(52) U.S. Cl.
CPC .................. *G06N 5/022* (2013.01); *H04W 4/18* (2013.01); *Y10S 707/923* (2013.01); *Y10S 707/957* (2013.01)
USPC .......................... 707/735; 707/923; 707/957

(58) Field of Classification Search
USPC ........................................ 707/722, 923, 957
See application file for complete search history.

(56) References Cited

U.S. PATENT DOCUMENTS

| 5,307,668 | A | * | 5/1994 | Vander Heyden | 73/30.02 |
| 5,427,790 | A | * | 6/1995 | Frische et al. | 554/175 |
| 5,619,632 | A | * | 4/1997 | Lamping et al. | 345/441 |
| 5,689,287 | A | * | 11/1997 | Mackinlay et al. | 345/427 |
| 5,944,822 | A | * | 8/1999 | Cornils | 726/1 |
| 6,199,034 | B1 | * | 3/2001 | Wical | 704/9 |
| 6,463,433 | B1 | * | 10/2002 | Baclawski | 1/1 |
| 6,523,026 | B1 | * | 2/2003 | Gillis | 1/1 |

(Continued)

OTHER PUBLICATIONS

Yianilos "Data Structures and Algorithms for Nearest Neighbor Search in General Metric Spaces", 1987. NEC Research Institute, pp. 311-321.*

(Continued)

*Primary Examiner* — Daniel Kuddus
(74) *Attorney, Agent, or Firm* — Fish & Richardson P.C.

(57) ABSTRACT

Methods, systems, and apparatus, including medium-encoded computer program products, for providing an adaptive knowledge platform. In one or more aspects, a system can include a knowledge management component to acquire, classify and disseminate information of a dataset; a human-computer interaction component to visualize multiple perspectives of the dataset and to model user interactions with the multiple perspectives; and an adaptivity component to modify one or more of the multiple perspectives of the dataset based on a user-interaction model.

20 Claims, 15 Drawing Sheets

(56) References Cited

U.S. PATENT DOCUMENTS

| | | | |
|---|---|---|---|
| 6,564,196 B1* | 5/2003 | Masuoka | 706/45 |
| 6,629,097 B1 | 9/2003 | Keith | |
| 6,785,667 B2* | 8/2004 | Orbanes et al. | 1/1 |
| 6,988,138 B1 | 1/2006 | Alcorn et al. | |
| 7,580,918 B2* | 8/2009 | Chang et al. | 1/1 |
| 7,921,376 B2* | 4/2011 | Robertson et al. | 715/782 |
| 2004/0003132 A1* | 1/2004 | Stanley et al. | 709/316 |
| 2005/0187849 A1* | 8/2005 | Bollapragada et al. | 705/36 |
| 2006/0116994 A1* | 6/2006 | Jonker et al. | 707/3 |
| 2006/0123080 A1* | 6/2006 | Baudino et al. | 709/204 |
| 2006/0218140 A1 | 9/2006 | Whitney et al. | |
| 2007/0100880 A1* | 5/2007 | Buscema | 707/104.1 |
| 2007/0112712 A1* | 5/2007 | Flinn et al. | 706/45 |
| 2007/0143691 A1* | 6/2007 | Abraham-Fuchs et al. | 715/751 |
| 2007/0174827 A1* | 7/2007 | Harper | 717/144 |
| 2008/0133982 A1* | 6/2008 | Rawlins et al. | 714/699 |
| 2009/0195536 A1* | 8/2009 | Louise et al. | 345/419 |

OTHER PUBLICATIONS

Robertson et al. "Information visualization using 3D interactive animation". ACM, vol. 36 Issue 4, Apr. 1993. pp. 57-71.*

Brooks, "Model-Based Three-Dimensional Interpretations of Two-Dimensional Images"; Pattern Analysis and Machine Intelligence, Mar. 1983, vol. PAMI-5, Issue: 2, pp. 140-150.*

Thomson et al., "Three-Dimensional Model Matching From an Unconstrained viewpoint"; IEEE, 1987, pp. 208-220.*

LeBlanc et al. "Exploring N-Dimensional Databases". VIS '90 Processing of the 1st conference on Visualization '90. pp. 230-237.*

Young, "Three Dimensional Information Visualisation", Visualisation Research Group, Computer Science Technical Report: Nov. 1996. pp. 1-31.*

Yoon, Hye Sook, Authorized Officer, Korean Intellectual Property Office, PCT International Application No. PCT/US2009/041909, filed Apr. 28, 2009, in Written Opinion mailed Nov. 11, 2010, 6 pages.

Bronstein et al., "Generalized multidimensional scaling: A framework for isometry-invariant partial surface matching", Jan. 31, 2006, PNAS, vol. 103, No. 5, pp. 1168-1172.

Cross, "Fuzzy Semantic Distance Measures Between Ontological Concepts", 2004, IEEE, pp. 635-640.

Dean et al., "MapReduce: Simplified Data Processing on Large Clusters", USENIX Association, OSDI 2004, 6$^{th}$ Symposium on Operating Systems Design and Implementation, pp. 137-149.

Lammel, "Google's MapReduce Programming Model—Revisited", SCP Journal 2008, 42 pages.

Resnik, "Using Information Content to Evaluate Semantic Similarity in a Taxonomy", 1995, Proceedings of the International Joint Conference on Artificial Intelligence, 6 pages.

Salton et al., "Extended Boolean Information Retrieval", Dec. 1983, Communications of the ACE, vol. 26, No. 12, pp. 1022-1036.

Shah et al., "Flux: An Adaptive Partitioning Operator for Continuous Query Systems", 2003, Proceedings of 19th International Conference on Data Engineering, pp. 1-12.

Yang et al., "Map-Reduce-Merge: Simplified Relational Data Processing on Large Clusters", Jun. 2007, SIGMOD, pp. 1029-1040.

* cited by examiner

FIG. 4C

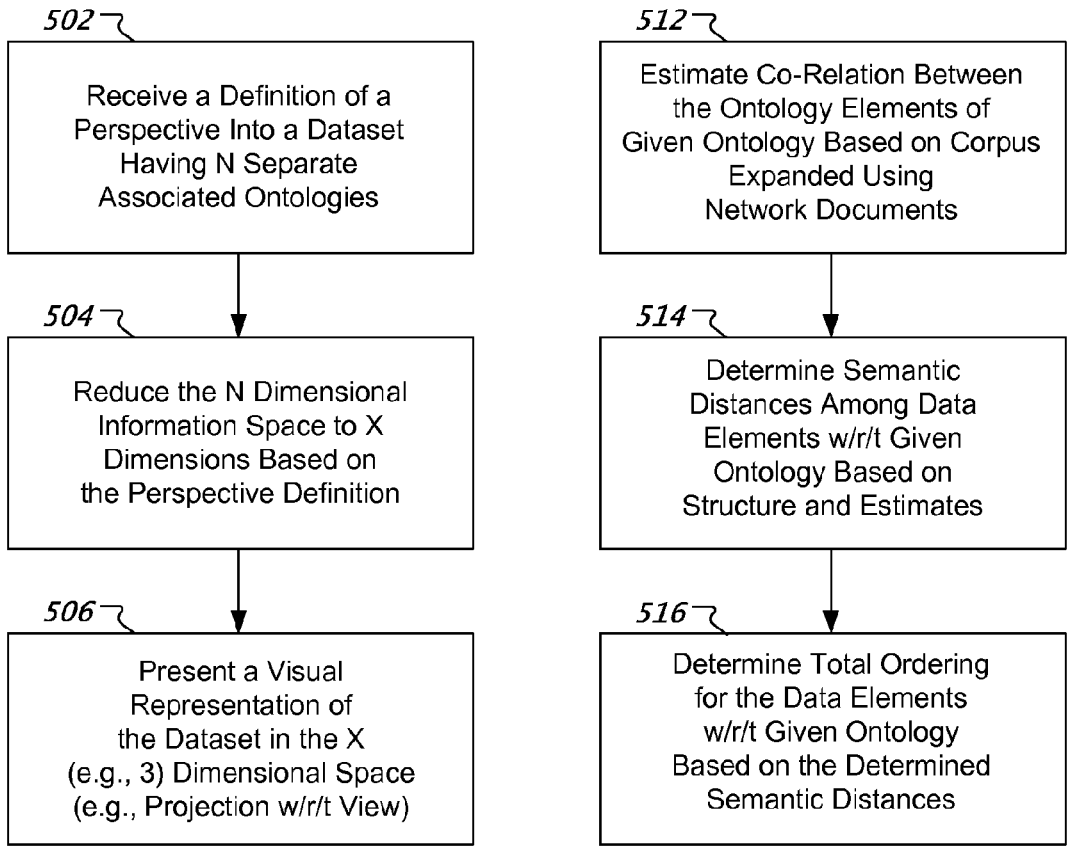
FIG. 5A
FIG. 5B
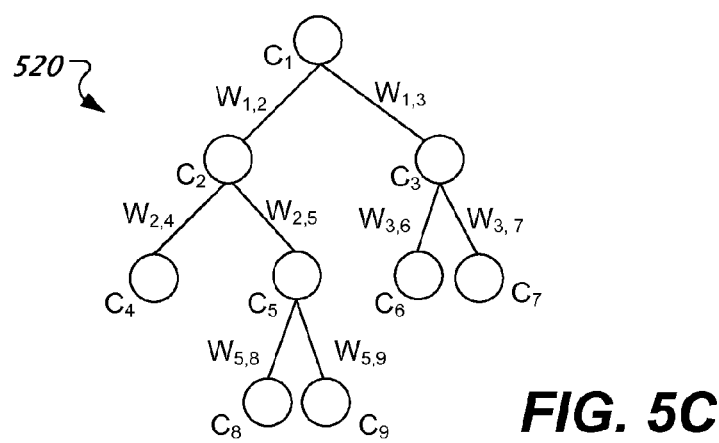
FIG. 5C

FIG. 7A

ADAPTIVE KNOWLEDGE PLATFORM

BACKGROUND

This specification relates to organizing, filtering, and accessing content in a content management system.

Various knowledge management systems have been implemented using different approaches to content classification, as well as different approaches to viewing the data contained in the system. Numerous methods have been developed to address content categorization and visualization. These methods have included the use of both symbolic knowledge representation and statistical machine learning techniques.

A symbolic knowledge representation is typically referred to as an ontology. In computer science, an ontology generally refers to a hierarchical knowledge structure that contains a vocabulary of terms and concepts for a specific knowledge domain and contains relevant interrelationships between those terms and concepts, typically represented in a tree data structure. A traditional symbolic knowledge ontology is typically constructed by hand by one or more domain experts, who will typically define the top level categories which form the structure of the ontology, and then manually fill in this structure. Human knowledge engineers also maintain and update this structure as new categories are created or discovered.

Another approach used in content management systems involves machine learning techniques. In computer science, machine learning typically refers to a class of algorithms that generally employ statistical and probabilistic analysis methods to learn information from designated sample data. In contrast with symbolic knowledge methods, machine learning methods represent knowledge in fuzzier and less precise ways. In a machine learning system, a set of training documents is identified for each category, and the system "learns" the relevant features (keywords and phrases) for each category. When a new document is presented to the system, the document's features are extracted and statistically compared to training document features previously extracted by the machine learning system. The result of the comparison is a set of categories and scores that best match the likely topics in the new document. This approach is scalable but can be very sensitive to the data in the document training set.

SUMMARY

This specification describes systems and methods relating to organizing, filtering, and accessing content, such as in a content management system.

In general, one or more aspects of the subject matter described in this specification can be embodied in a system that includes a knowledge management component to acquire, classify and disseminate information of a dataset; a human-computer interaction component to visualize multiple perspectives of the dataset and to model user interactions with the multiple perspectives; and an adaptivity component to modify one or more of the multiple perspectives of the dataset based on a user-interaction model. The knowledge management component, the human-computer interaction component and the adaptivity component can include multiple code-pendent subsystems that are linked together in a mutually integrative feedback loop.

The adaptivity component can include a directed organization subsystem to support user-specified content organization; a dynamic organization subsystem to support automatic content adaptation to a given user; and an evaluation subsystem to assess performance of both users and the system and provide feedback to the system for modification. The knowledge management component can include a semantic annotation subsystem to capture semantic meaning of, and contextual relationships between, multiple pieces of the information; a content acquisition subsystem to automatically retrieve new information for the dataset in accordance with one or more specified criteria; and a classification subsystem to automatically categorize the new information in the dataset using, at least in part, the semantic annotation subsystem. The human-computer interaction component can include one or more visualization subsystems to reorganize and present the information of the dataset, and to facilitate user-defined connections among the information; and a search subsystem to perform semantic-context based text searches. In addition, other embodiments of these one or more aspects can include corresponding methods, apparatus, and computer program products.

One or more aspects of the subject matter described in this specification can be embodied in one or more methods that include receiving a definition of a perspective into a dataset associated with N separate ontologies that each specify relationships among data elements in the dataset, wherein N is greater than two, the N separate ontologies correspond to an N dimensional information space, and the data elements are placed in the N dimensional information space according to semantic similarity among ontology elements; reducing the N dimensional information space to X dimensions based on the perspective definition, wherein X is greater than one and less than N; and presenting a visual representation of the dataset in the X dimensional space. The value of X can be three (or four or more), and presenting the visual representation can include presenting nodes, which correspond to at least some of the data elements, in the three dimensional space. Moreover, presenting the nodes in the three dimensional space can include projecting the three dimensional space into a two dimensional display area with the nodes presented using size and brightness to represent distance from a current view point in the three dimensional space.

The data elements can be placed in the N dimensional information space by a process including determining distances among the data elements with respect to a given ontology based on a tree structure of the given ontology and estimates of co-relation between the ontology elements of the given ontology, wherein the estimates are based on a corpus including data elements associated with the ontology elements and documents retrieved from a computer network in accordance with terms retrieved from the data elements associated with the ontology elements. Reducing the N dimensional information space can include performing co-relation analysis for ontology dimensions corresponding to the N separate ontologies; performing multi-dimensional scaling for the ontology dimensions in accordance with the perspective and weighted distances associated with the ontology elements of the N separate ontologies; and finding a solution to a stress function corresponding to the multi-dimensional scaling.

Performing the co-relation analysis can include organizing the ontology dimensions into clusters according to their Pearson Coefficients. Performing the co-relation analysis can include performing a principal component analysis (PCA). Moreover, each of the N separate ontologies can include an element used for data for which the ontology is not applicable.

Other embodiments of these one or more aspects include corresponding computer program products, apparatus, and systems. For example, a system can include a user interface device; and one or more computers operable to interact with the user interface device and to perform the method operations. Moreover, other embodiments can include a computer-readable medium encoding a computer program product operable to cause data processing apparatus to perform the method operations.

Particular embodiments of the subject matter described in this specification can be implemented to realize one or more of the following advantages. Content, which can be stored in computer systems and networks, can be readily organized, filtered, and accessing in virtually any knowledge domain. A content management system can bring together knowledge management, adaptivity, and human-computer interaction in a deeply integrated way. Multiple systems and subsystems can be integrated into a content neutral knowledge platform, which can be used to organize, filter and access a dataset that pertains to multiple knowledge domains.

Core systems and subsystems can support powerful visualization, perspective-driven data organization, dynamic content growth, search, adaptivity, and evaluation capabilities. The knowledge platform can provide one or more of the following capabilities. Large bodies of content can be visualized intuitively and clearly, with visual representations suggestive of meaning. Navigation through the content can be facilitated and informed by the system so users will less likely feel lost. Contextual information can be provided to enhance understanding and potential knowledge discovery. Semantic search of a given dataset, and metasearch of sources outside the given dataset, can be supported. Users can designate multilinear pathways through the content of the dataset. User-created pathways designating instructional approaches through content can be supported. Multiple perspectives of the dataset can be displayed, as well as intersecting disciplines and points of view within the dataset. Quantitative content can be integrated with qualitative perspectives. A system for hypothesis creation and testing can be realized. The knowledge platform can efficiently evolve with new content—both automatically and through user-collaboration. Content delivery can be automatically custom-tailored to a range of user needs. Moreover, user response and effectiveness of the content on the user can be evaluated.

A knowledge platform can integrate dynamic content organization (such as automatic content acquisition, classifying, and filtering), contextual browsing, and customized content delivery. It can allow users to see the whole picture of content (and see both the proverbial forest of information as well as the individual trees); spot gaps in data sets and relationships; easily access the content they need when they need it; visualize critical data factors that are important to users (such as, for instance, the dimension of time); and provide facilitated and informed navigation through data fields. Accessing and utilizing information can be facilitated with tools that support: the accumulation of new, relevant knowledge classified to facilitate maximum understanding and accessibility; the archiving and dissemination of content within relational contexts of meaning; the personalization of content delivery; and the ability to integrate quantitative and qualitative information. Content provided by the system can be made easier to access, more efficient to search or browse, and simpler for users to identify what they need when they need it. A broad contextual perspective on information can be provided, and fewer limitations need be placed on how content is visualized in relation to other content. A wide variety of user needs for personalized information delivery can be addressed and responded to, the display of multiple perspectives of a given body of content can be supported, multiple sets of quantitative data can be readily and intuitively integrated with qualitative information, hypothesis creation, modeling and testing can be facilitated, and user response to, and the effectiveness of, content delivered within a nonlinear hierarchy context can be evaluated. The knowledge platform can employ annotation tools that support both key word and semantic annotation in an integrated easy-to-use system. An automatic knowledge acquisition system can be bundled with other technologies in a way that supports semantic annotation and personalized information classification, filtering, and delivery.

A knowledge platform, as described herein, can be implemented as a content management system for multiple types of datasets and within various application contexts. For example, the systems and techniques described herein can be implemented in a multimedia archive management system used to archive and retrieve multimedia content. This can provide an integrated approach to present content in a given dataset that frames the parts in context of the whole, even as it provides for easy access, filtering, and dissemination.

Because the systems and techniques described herein can tailor the display and dissemination of content, and do so according to system evaluations of user experiences, needs can be met in (but not limited to) the following areas: education (including professional development), both in conjunction with traditional classroom learning as well as many, if not all variations of distance learning; business and finance (including financial services); sales and presentations, and any area where the dynamic reorganization of content is important; travel, tourism, hospitality, and any area where the personalization of information is important; museum, catalogue, gallery, and sectors of the heritage industry; personal, business, and government negotiation, including conflict resolution, and any area where viewing a given phenomenon from multiple perspectives is important; strategy communication, and any area where multiple users must be able to access the same body of information from their own and others' points of view; high-value content organization and delivery; risk analysis; hypothesis testing; and internal and external communications, to name just a few.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4C shows the user interface of FIG. 4B after a user has selected the learning pathways check-box control.

FIG. 5A shows an example process of generating a visual representation of a dataset based on a defined perspective.

FIG. 5B shows an example process of placing data elements in an N dimensional information space.

FIG. 5C shows an example ontology structure.

FIG. 7A shows an example user interface displaying the automatic collection, filtering, and annotation process.

Like reference numbers and designations in the various drawings indicate like elements.

DETAILED DESCRIPTION

Figure 1:
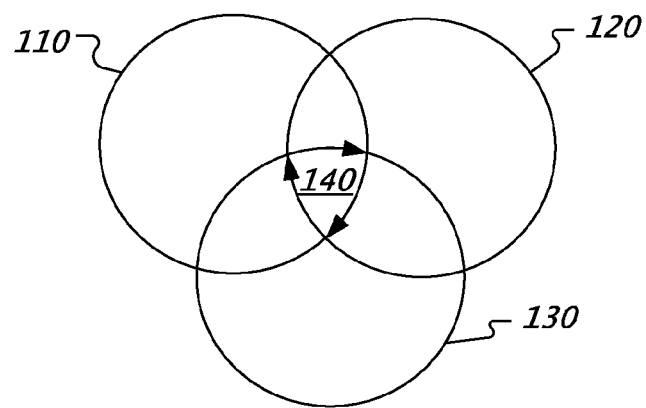
FIG. 1 shows a conceptual diagram of an example system.

FIG. 1 shows a conceptual diagram of an example system. This system can be understood in terms of three main components, which intersect and interrelate to form a knowledge platform. The system can include a knowledge management system 110, a human-computer interaction system 120 and an adaptivity system 130. Each of these systems can, in turn, be composed of multiple subsystems, as is described in further detail below. While these systems and subsystems can be used in independent, modular fashion, they can also be integrated in a feedback system 140 that unites them for a common purpose.

The feedback system 140 can integrate the various systems and subsystems such that activity occurring in one will affect the behavior of another. For example, the human-computer interaction system 120 can evaluate a user's specific needs (such as learning level or interests), the adaptivity system 130 can then adjust the platform's behavior according to the feedback it has received, and the knowledge management system 110 can organize the dataset to disseminate content accordingly. Thus, the feedback system 140 can make the knowledge platform more effective and efficient by adapting the way the system interacts with the user. For example, user interaction data can be used in the following ways: (1) to improve the evaluation engine's performance, allowing the evaluation engine to provide data which allows the other systems to adapt automatically; (2) to detect user profiles and adapt in personalized ways; and (3) with the user interaction data in aggregate, to provide critical data that can be helpful in policy making, hypothesis testing, strategy construction, and methodology analysis. Thus, the feedback system can not only improve the evaluation engine's performance on an ongoing basis, it can provide raw data to be analyzed to better understand the user—either by the system itself, or through other available analysis tools (e.g., the data can be provided to others for their use in third party analysis systems).

In adapting to individual users, the system can custom-tailor content. For example, the system can change content presentation methods (e.g., graphical, theorem-oriented, symbolic, etc.), content difficulty level, and/or content delivery order (e.g., different users may, in fact, believe the system has different content repositories as well as content organization and structure). The system can also evaluate the effectiveness of content delivery through a plug-in evaluation model, and optimize the adaptivity parameters and rules in order to achieve better effectiveness in content delivery as well as achieve better knowledge retention. Further details regarding the feedback system 140 are described below in connection with the example subsystems described. In addition, the systems and techniques described herein can be implemented using off-the-shelf hardware that has been appropriately programmed in accordance with the algorithms and software architectures described.

Figure 2:
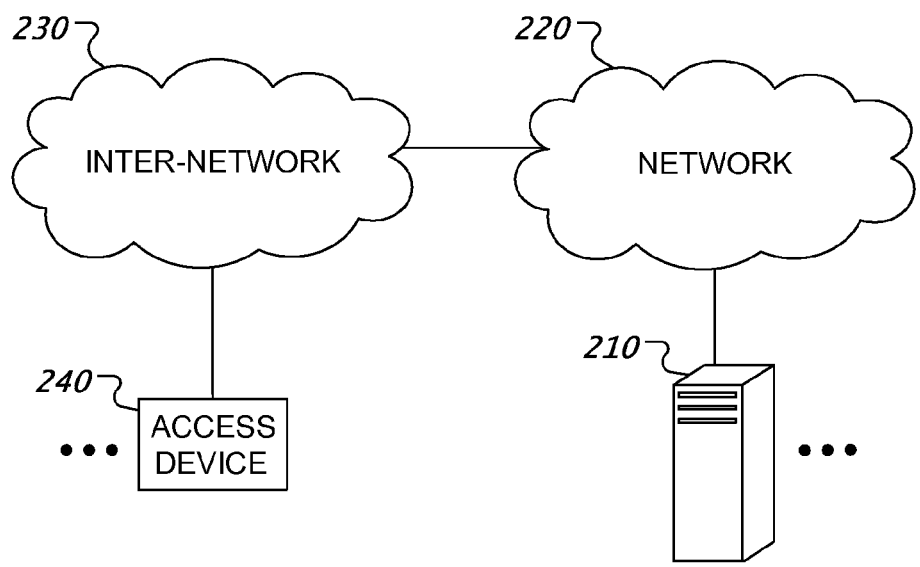
FIG. 2 shows example networks and apparatus with which the described system(s) can be implemented.

FIG. 2 shows example networks and apparatus with which the described system(s) can be implemented. One or more server computers 210 can be provided to store data and supply the described functionality. The server computer(s) 210 can be a server cluster, a single server computer, and/or distributed geographically. Note that the use of the word "server" does not imply that the computer(s) 210 need be expensive, high-end servers, but rather, simply that the computer(s) 210 serve up data and functionality upon request. The server(s) 210 can be general purpose personal computers that have been appropriately programmed.

The server computer(s) 210 can be connected to a network, which can be a proprietary network (e.g., an Ethernet based enterprise network) or a public network (e.g., the Internet). In the example shown, the server computer(s) 210 are connected with a local area network 220, which in turn is connected to an inter-network 230. One or more access devices 240 can connect with the inter-network 230 to gain access to the data and functionality provided by the server computer(s) 210. The access device(s) 240 can include personal desktop computers that connect to the inter-network 230 through a wired connection (e.g., a cable modem, Digital Subscriber Line, or T1 line) and mobile computers (e.g., laptop, mobile phone, personal digital assistant, etc.) that connect to the inter-network 230 through a wireless connection. As will be appreciated, many other hardware systems and networks are also possible.

Figure 3A:
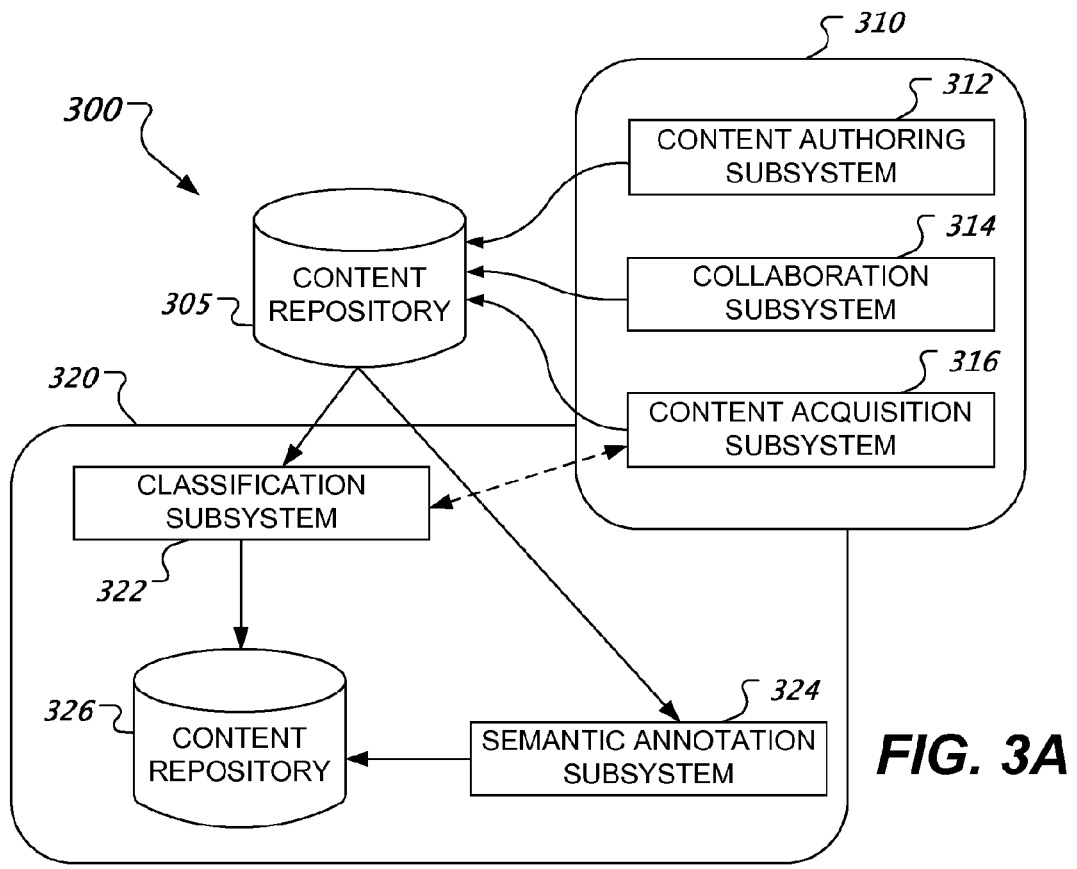
FIG. 3A shows an example architecture for a knowledge management system.

FIG. 3A shows an example architecture for a knowledge management system 300. The knowledge management system 300 can provide a systemic and aggregated approach to acquiring, classifying, and retrieving information. Various input subsystems can connect with, and provide data to, a content repository 305. These input subsystems can be integrated together to form a knowledge aggregator 310 that works with various processing subsystems 320 to automatically acquire, filter and classify content to support content growth in the knowledge platform.

The knowledge aggregator 310 can include a content authoring subsystem 312, a collaborative contribution subsystem 314, and a content acquisition subsystem 316. The content authoring subsystem 312 can provide a user interface allows users (e.g., designated users with appropriate content authoring permissions) to tailor content to their specific needs by giving them opportunities to create and/or edit a full variety of media types (e.g., video, audio and text). The content authoring subsystem 312 can support various types of known media editing and compiling processes and workflows, including video and audio voice extraction.

The collaborative contribution subsystem 314 can provide a user interface that allows users (e.g., all platform users) to participate in providing collaborative content, such as notes, new and freshly-imported content, contextual information annotating content, and qualitative parameters used for shaping new perspectives. The collaborative contribution subsystem 314 can include access control functions (such as with the content authoring subsystem 312) to limit collaborative contributions to users that have been authorized to make such contributions.

The content acquisition subsystem 316 can automatically retrieve new content in accordance with specified criteria. For example, content acquisition subsystem 316 can target user-determined high-value content sources (such as current affairs feeds or new material that has recently been added to the curriculum of a course) and automatically acquires relevant pieces of information. The content acquisition subsystem 316 can retrieve data from RSS (Really Simple Syndication) feeds, Web searches, focused site monitoring, and crawler-based information discovery, in addition to private files, specialist information (such as scientific papers, financial, and legal information), and multimedia sources, as well as sources that utilize languages other than English. Content collected can include quantitative information (such as mathematical and financial data), qualitative information (such as content related to media, philosophy, religion, language studies, etc.), and information that is both qualitative and quantitative by nature (such as content related to the social sciences, law, history, business, education, culture, etc.). Relevant content sources can be determined by: (1) the system designers, (2) the targeted system license-holder, and/or (3) system users (which can be through direct user input or indirect feedback through, for example, the evaluation system).

The processing subsystems 320 can include a classification subsystem 322 and a semantic annotation subsystem 324 that interact with an annotation repository 326. The semantic annotation subsystem 324 can capture semantic meaning of, and contextual relationships among, various pieces of the content stored in the content repository 305. The classification subsystem 322 can automatically categorize new content using, at least in part, the semantic annotation subsystem 324. As a result, new content coming into the system can be automatically organized, thus allowing new platform content to become dynamic, without consuming large amounts of human time in processing it.

The semantic annotation subsystem 324 can provide an environment for semantic annotation of all content managed by the knowledge platform. The semantic annotation subsystem 324 can include one or more annotation tools that support an integrated approach to categorical annotation (e.g., by media type, key words, etc.) and semantic annotation through the use of ontological hierarchies. The semantic annotation subsystem 324 can also include a user interface that brings together (e.g., in one display screen) content designated to be annotated with a range of semantic annotation tools in support of accurate and efficient contextual annotation. Further details regarding examples of these tools are described below.

As shown in FIG. 3, content can be obtained from the input subsystems 310 and stored in the content repository 305. The processing subsystems 320 can then annotate the new content with metadata and ontology associations in a manual or automatic fashion, as is described in further detail below. As indicated by the dashed line in FIG. 3, the content acquisition subsystem 316 can use the classification subsystem 322 to do content filtering, topic identification, etc. Furthermore, the various subsystems of the knowledge management system 300 can be integrated with the human-computer interaction component(s) and adaptivity component(s), as described herein, in a networked combination of systems and subsystems, to realize an adaptive knowledge platform.

Content administrator(s) can be provided an interface through which to specify the data sources from which the data are to be imported and the frequency with which the system should retrieve new data. Data sources can include: search results from Internet search engines, news and RSS feeds such as news websites and blogs, online public/private library catalogs, publications, papers, proprietary databases, incoming emails, etc. The system can also monitor file changes in specified file directories. After retrieving the data, the classification subsystem 322 can perform a series of processing operations for the data. First, it can determine if a particular retrieved data is relevant or irrelevant to the user needs. The system can match the retrieved data to content in the repository to calculate a similarity measure by TFxIDF (or possibly use mutual information) and discard those data with similarity values less than a pre-defined threshold. Then, the remaining data can be annotated with proper meta-data (such as data sources, date, content type, etc.) and annotated with topics and ontologies. The classification subsystem 322 can use the initial expert-compiled data as training data, then predict the topic and ontology concepts of the retrieved data.

Figure 3B:
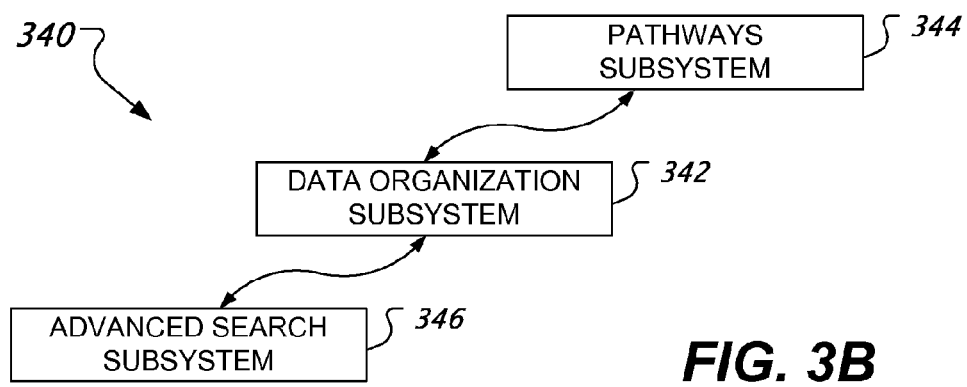
FIG. 3B shows an example architecture for a human-computer interaction system.

FIG. 3B shows an example architecture for a human-computer interaction system 340. The human-computer interaction system 340 can model multiple perspectives into diverse content that the other systems and subsystems make possible. The human-computer interaction system 340 can also translate the intent, interests, and ability levels of users to the other systems and subsystems. Moreover, the human-computer interaction system 340 can include one or more visualization subsystems that can be used to represent content in multidimensional visualization displays, which can be two dimensional (2D), three dimensional (3D), four dimensional (4D), or more.

The human-computer interaction system 340 can include a data organization subsystem 342 that presents reorganized views of the content of the knowledge platform. The data organization subsystem 342 can be a visualization subsystem that can dynamically reorganize the presented content according to a defined perspective, which can be governed by multiple different inputs, including qualitative ones, and which can be a pre-defined perspective or a dynamically defined perspective (e.g., dynamically defined according to user interests and needs, as these are discovered). Note that the data can be presented in a manner that is not tied to organizational patterns of the underlying physical storage. Data can dynamically reorganize in response to user preferences and interests in ways that do not conform to any one single ontology.

The human-computer interaction system 340 can include a pathways subsystem 344 that facilitates user-defined connections among the stored content. The pathways subsystem 344 can be a visualization subsystem that enables users to connect pieces of content in their own novel and meaningful patterns (managers or instructors, for instance, may designate unique pathways; user pathways may also be traced [displaying the usage history of one or more users] and/or designated). The pathways subsystem 344 can also promote a process of collaborative recommendation, whereby highly recommended pathways are the ones that users have chosen (whether previously designated a pathway or not).

The human-computer interaction system 340 can include an advanced search subsystem 346 that lets users augment the stored content with additional content from network resources (e.g., high-quality Web sources). The search performed by the advanced search subsystem 346 can be done at the level of semantic meaning rather than simply in a standard syntactic manner. As a result, the search subsystem 346 can decrease the amount of irrelevant hits typical for most Web searches. For example, the search process can involve automatic query modification and can be implemented using the following iterative process:

Algorithm: given a set of search terms $<S_1, \ldots, S_N>$ queried by the user.

1. For each $S_i$, find the ontology concepts, $<C_{i1}, \ldots C_{iM}>$, that were annotated to any documents that contain term Si.
2. Sort the concepts with respect to their frequencies. Let C=the resulting concepts.
3. For each concept c in C, use search terms $<S_1, \ldots S_N>$ and c to search the knowledge base.
4. Aggregate the search results.
5. If insufficient results are found, the system can keep augmenting the search terms by adding ontology concepts that are parents of the found ontology concepts, $<C_{i1}, \ldots C_{iM}>$. (Note that the threshold used to assess whether enough results have been found can have a default value set according to the size of the knowledge base relative to the number of concepts in the ontologies linked with the knowledge base, and the threshold can be changed by user(s) of the system as desired.)

As an example of the above process, suppose the user submits query terms: I.M.Pei and Museum. Ontology concepts that were annotated to documents containing the search terms can be found. The results of this search, for the term "I.M.Pei", can be the following ontology concepts associated with it: Architect, Architecture, Modernity, Chinese. For the term "Museum", the following ontology concepts associated with it can be found: Architecture, Arts. The system can then sort the concepts, resulting in: Architecture (2), Architect (1), Modernity (1), Chinese (1), Arts (1). Then the system can use "I.M.Pei", "Museum", and "Architecture" as search terms to search the knowledge base. Then the system can use "I.M.Pei", "Museum", and "Architect" as search terms to search the knowledge base. Then the system can use "I.M.Pei", "Museum", and "Modernity" as search terms to search the knowledge base. Then the system can use "I.M.Pei", "Museum", and "Chinese" as search terms to search the knowledge base. Then the system can use "I.M.Pei", "Museum", and "Arts" as search terms to search the knowledge base. Then the system can aggregate the search results, presenting them to the user in the order according to their relevancy score.

Figure 3C:
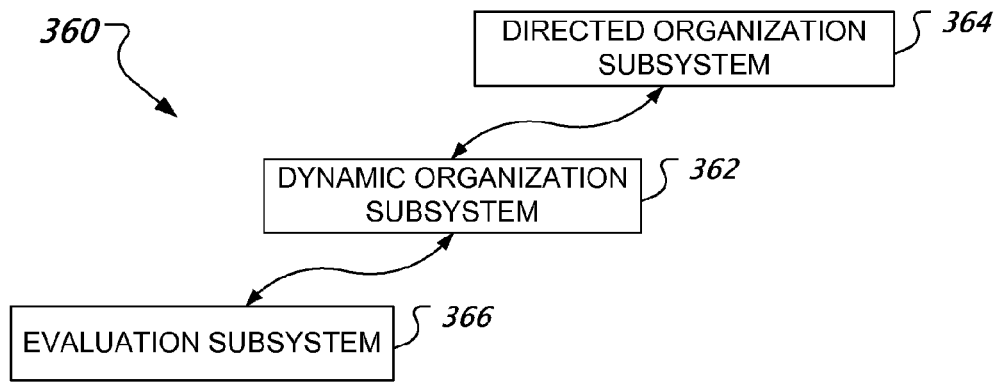
FIG. 3C shows an example architecture for an adaptivity system.

FIG. 3C shows an example architecture for an adaptivity system 360. The adaptivity system 360 can allow a given universe of content (i.e., a dataset) to dynamically organize, multiple times and in multiple ways, according to quantitative as well as qualitative measures, such as user needs, interests and knowledge levels. Thus, the adaptivity system 360 can work in conjunction with the other system components to provide a content organization delivery system that is non-hierarchical, non-linear, and dynamic by nature. A resulting knowledge platform can be responsive to the user environment due to deep integration between the various systems described. For instance, the adaptivity system 360 can use the human-computer interaction system to appropriately interpret user needs, and can use the knowledge management system to determine the relationship between various pieces of content. Thus, the system can integrate content delivery, user interaction, and adaptivity together, where each piece affects the behaviors of the others.

The adaptivity system 360 can include a dynamic organization subsystem 362, a directed organization subsystem 364, and an evaluation subsystem 366. The directed organization subsystem 364 can support user-specified content organization. Thus, designated platform users (such as instructors or managers) can be given the ability to organize content at will in order to meet their own needs. The dynamic organization subsystem 362 can support automatic content adaptation to a given user. Thus, the system can automatically adjust the delivery of content to a given user based on the interests and abilities of the user, as modeled by the system. The evaluation subsystem 366 can assess the performance of both the users (e.g., learners, instructors, managers, etc.) and the system itself to determine effectiveness.

As noted above, the knowledge platform can be designed to allow human-computer interactions to trigger the organization of the knowledge and its delivery parameters, which in turn trigger the evaluation of the system adaptive parameters. The change of system adaptive parameters and rules, in turn, affect the human-computer interactions. This integration and interconnection of the various components forms the feedback system and creates a feedback loop, where knowledge management feeds the human-computer interaction, which feeds the system adaptivity, which feeds the knowledge management, and so on.

To effectively implement this feedback system, the evaluation subsystem 366 can actively evaluate user behavior and system effectiveness. The system can automatically detect user profiles, which can include user interests, user learning abilities, user reaction to different stimuli and content types, etc. The system can constantly evaluate user interactions and personalize content delivery for each individual's assessed needs. User interaction data may include click-through logs, stay periods, user selections, question-and-answer responses, user comments, interactions between users in the system, etc. This information provides valuable data for evaluating user attributes.

User data can include, but is not limited to, the node visited in sequence, the time elapse that the user spent on any particular node, the notes this user wrote or viewed, his/her answer to interactive questions in the node if any, login time, logout time, etc. Such information can be stored in local cache and sent back to server periodically. Such data can form the features in the user profile. The user profile can include standard user information (such as name, gender, etc.), performance data (grades) as well as: node traversal patterns (the sequence of nodes that the user visited), frequency and time elapse in different content types that the user spent on, perspective jumps, etc. Such features can be used to classify users into several different groups. The adaptivity subsystem can use this information to custom deliver content to users.

Figure 3D:
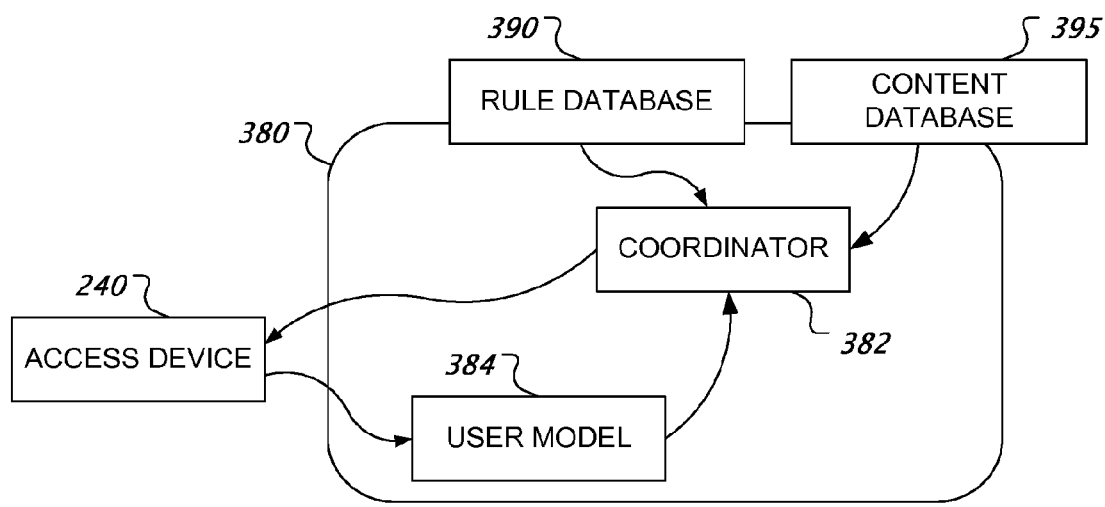
FIG. 3D shows an example evaluation engine.

FIG. 3D shows an example evaluation engine 380 that can be used in this process. The evaluation engine 380 includes a coordinator 382 to interact with a user model 384 (which received user behavior information), a rule database 390 and a content database 395, to provide customized content delivery to an identified user at an access device 240. Through a series of human-computer interactions, the system can gather the effectiveness of content delivery rules with respect to user performance. The evaluation subsystem can optimize the adaptivity parameters according to learning theories. The adjusted adaptivity parameters can be used for proceeding content delivery strategies, whereupon the entire cycle begins again.

There are several applications for this feedback system. For example, different teaching methodologies can be tested anonymously through the system by changing the evaluation rules or by gauging effectiveness of different methodologies embedded in the same system. User interaction and performance data can then be evaluated for methodology effectiveness. For example, if the system is used to teach math, and different methodologies for teaching math are embedded in the system, then the system can provide hard data about how well students are really doing and which of the methodologies really works.

Another sample way of using this system is to instruct students with different learning levels. The system can adapt to each student's need and content delivery requirements with appropriate levels of difficulty tailored to meet an individual student's need. Similarly, within a business, knowledge and/or strategy can be communicated by reshaping content delivery to conform to different job descriptions, management concerns, risk analyses, skill-sets, and/or requirements. Within a sales environment, content delivery can be reshaped according to the potential customer's specified interests or according to the system's evaluation of his or her interests and needs.

As another example, the knowledge platform can implemented in a multimedia archive model for multimedia content. The model can be characterized by an opening screen that includes introductory/orientation multimedia content and access platform functions (e.g., after launching the program, it shows a traditional linear documentary film), plus an archived body of content existing "behind" the opening screen, with content signifiers represented in a 2D, 3D or 4D information space. The introductory/orientation screen can contain multimedia and a mix of media or text, but in any even, this screen can serve to introduce and establish for the user the information domain of the archive, which opens subsequently.

By way of a single keystroke, the introductory/orientation material can be made to disappear, and the referenced archive—containing original and/or related video, text, photography, maps, etc.—opens up as a world to be explored in multi-dimensional representation, such as described further below in connection with FIGS. 4A-4E. A user of the archive can stay within this information universe or return to the introductory/orientation material at any time. The archive can be organized in the content universe according to a default perspective (with, for example, time on the Z axis), with other perspectives being optional. Content can be contained in numerous parent/child nesting nodes signifying content and contextual information. These can be included along with other knowledge platform features described herein.

Figure 4A:
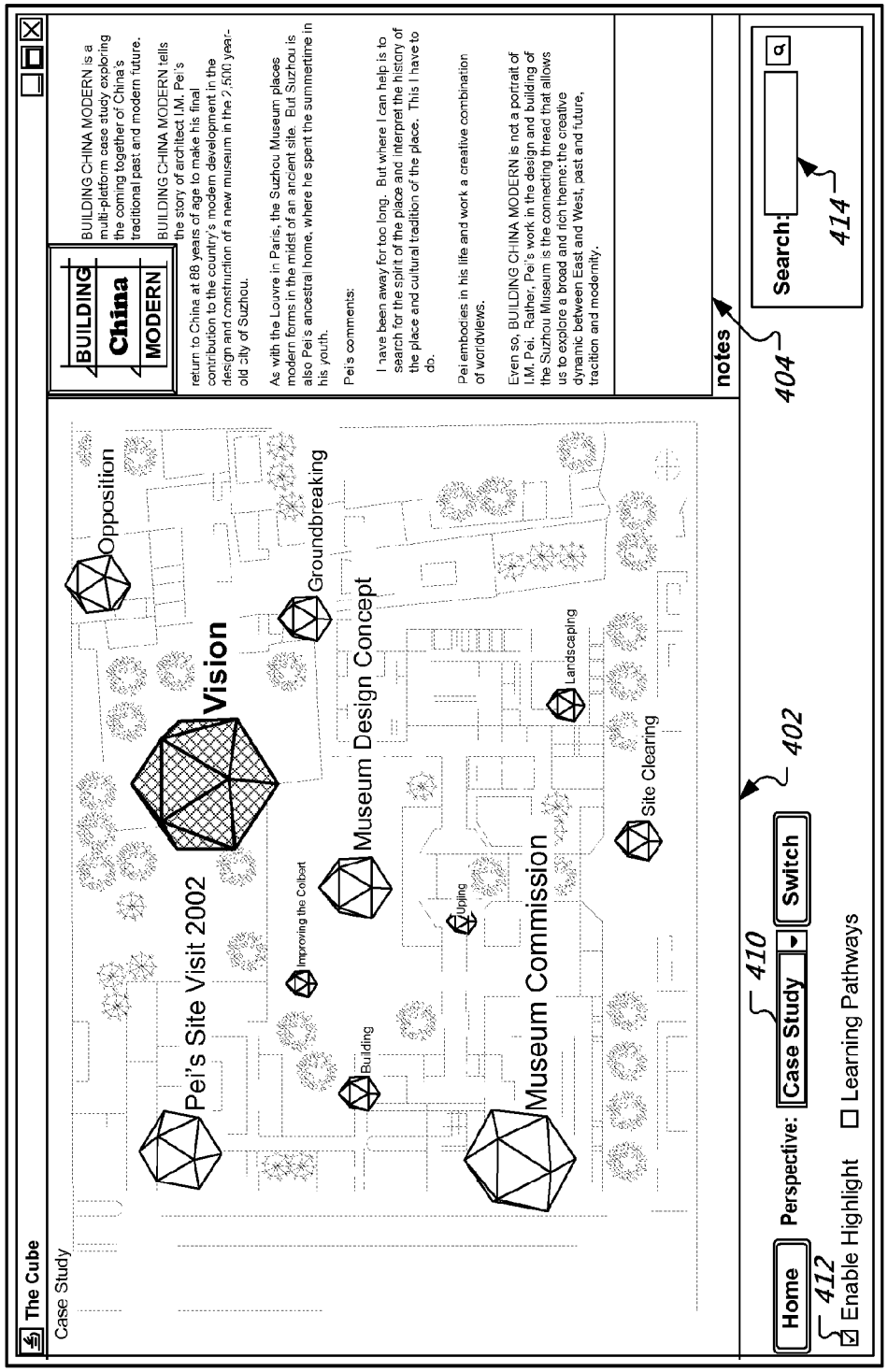
FIG. 4A shows an example user interface including content signifiers represented in a three dimensional information space that has been projected into a two dimensional display area.

FIG. 4A shows an example user interface including content signifiers represented in a 3D information space that has been projected into a 2D display area 402. The 3D information space contains content signifiers, referred to as nodes, that visually represent content that has been organized according a particular perspective into a larger information universe (i.e., an N dimensional total information space). The nodes shown in this example are Vision, Museum Commission, Museum Design Concept, Pei's Site Visit 2002, Groundbreaking, Site Clearing, Opposition, Building, Landscaping, Improving the Collection.

The nodes can be placed in the 3D information space in accordance with their associated positions along the defining axes of the 3D information space. As is described in further detail below, the system can reduce the N dimensional total information space into the 3D information space based on a current perspective definition. When the nodes are placed in the 3D information space, nodes that are farther away from the current view point can be made smaller (due to the perspective projection of the 3D space into the 2D display area) and also darker. The labeling information can also be displayed using a smaller font. Thus, the significance of the displayed nodes, with respect to the current view point, can be visually represented in the display area 402. Note also that the total screen area used by the information space can be increased or decreased at will, by the user.

The nodes can be represented using geometric solids (as shown), or other types of icons or symbols can be used, including icons or symbols that are changed in accordance with the underlying content represented by a node. In general, the nodes can convey contextual information in a number of ways. The distance between nodes, for instance, is significant as a visual representation of the relatedness of the information they contain. Node color, shape, texture, and patterns can also be signifiers of meaning, with each signifier referencing a different attribute of the same content source. In this way, users can be provided with deep information about any piece of data.

The currently selected node (the Vision node is currently selected in FIG. 4A) can be highlighted in some fashion, such as by drawing the node's graphic using a different color. The currently selected node can have its corresponding content displayed in a detailed display area 404. This can be a side panel as shown, or a full-screen display area. The detailed display area 404 can support a full range of multimedia content (e.g., video, audio, text, images, etc.). When a user selects a particular node, the corresponding content can be presented in the detailed display area 404 (e.g., new text can be displayed and a corresponding video can begin playing). Users can expand or contract the size and shape of the detailed display area at will.

Figure 4B:
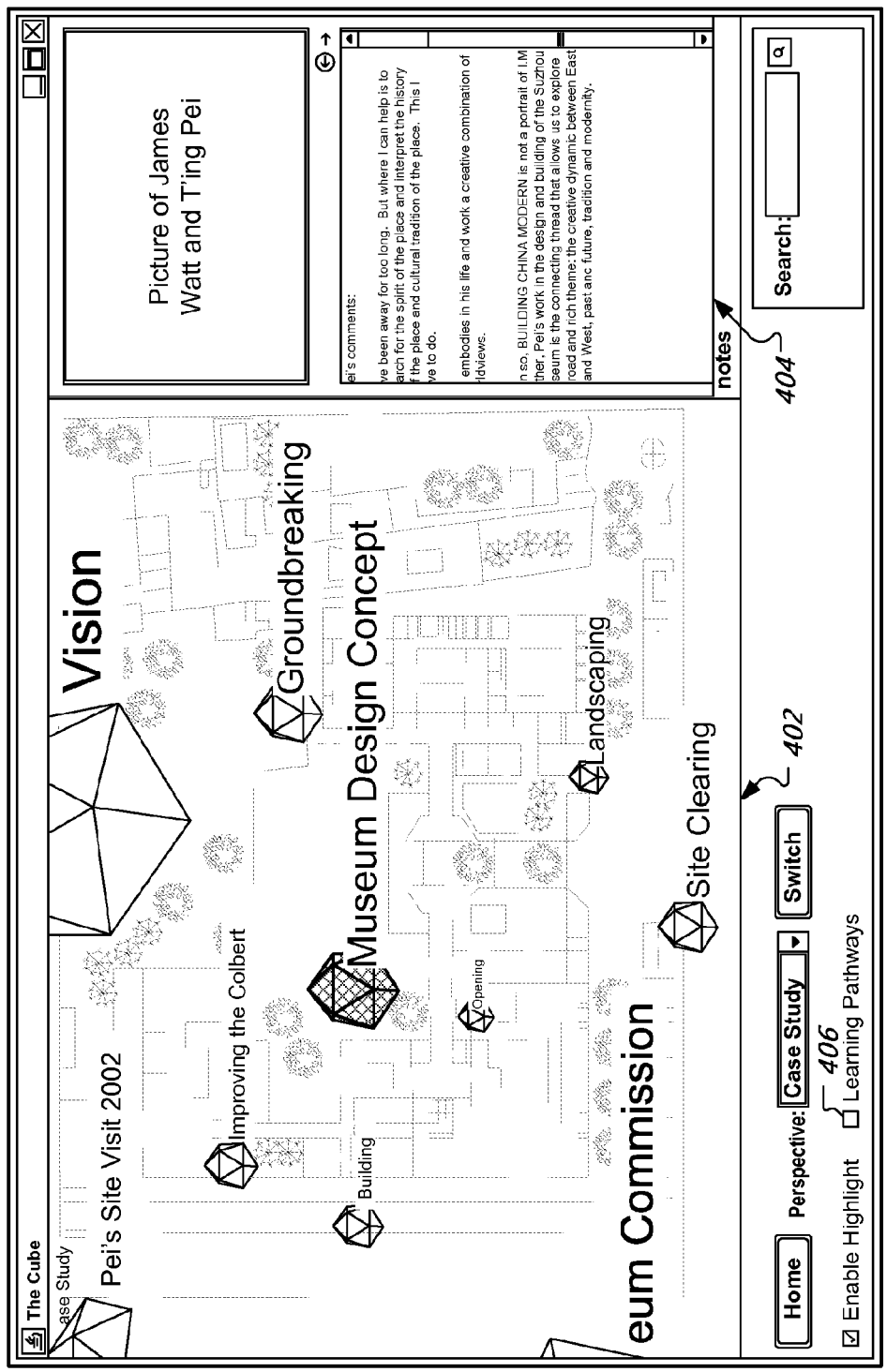
FIG. 4B shows the user interface of FIG. 4A after a user has selected the Museum Design Concept node.

Moreover, with the aid of an input device (e.g., a mouse), a user can move into and through the 3D information space multi-linearly, selecting any nodes of interest. For example, FIG. 4B shows the user interface of FIG. 4A after a user has selected the Museum Design Concept node. As shown, the user's point of view within the 3D space has been changed within the display area 402, the Museum Design Concept node has been highlighted (e.g., its color has been changed) and details of the corresponding content have been presented in the detailed display area 404. A check-box control 412 also allows the user to enable a headlight functionality. This affects the color of the nodes by turning on or off a "source of lighting."

In addition, the nodes can be organized into parents and children. Parent nodes contain all of the content related to subsidiary information; the latter is organized as child nodes of a parent, with child nodes containing more detailed content than a parent displays. Child nodes may themselves be parents of other child nodes, and so on, so that by drilling down within any parent-child node cluster, users may find nodes within nodes—with each child node containing a more refined and detailed knowledge set. For example, in the context of a WINDOWS® based personal computer, by single left-clicking a parent node, a thumbnail description of the node's content can be made to appear in a small information box closely associated with the node; by double left-clicking a node, its associated content can be presented in the detailed display area 404; by single right-clicking the same parent node, its child nodes can be displayed within the display area 402.

In some implementations, users can move through the presented information space in the following way: by left-clicking and dragging the mouse up, the user moves "into" the 3D space along the Z axis; by left-clicking and dragging the mouse down, the user "backs up" within the 3D space along the Z axis; left-clicking and dragging the mouse to the right moves the collection of nodes within the information universe to the left; left-clicking and dragging the mouse to the left moves the collection of nodes within the information universe to the right. Subtle degrees of movement can be achieved by dragging the mouse in axes other than along purely X or Y or Z. To move "around to the left" of a node or the collection of nodes, a user right-clicks and drags the mouse to the right; to move "around to the right" of a node or collection of nodes, a user right-clicks and drags the mouse to the left; to move "above" a node or collection of nodes, a user right-clicks and drags the mouse down; to move "below" a node or collection of nodes, a user right-clicks and drags the mouse up. Again, subtle movement can be achieved by dragging the mouse in other than strict up/down/left/right patterns. For users who find these mouse implementations counter-intuitive, the system can easily be reprogrammed for other click-and-drag operations to meet their needs. Click-and-drag instructions are available in a pop-up window in the opening screen of the information universe and can be saved on the screen if the user desires.

Organizing and presenting content as shown in FIGS. 4A and 4B allows users to move through an enormous body of information—and make intuitive sense of it—without being lost or overwhelmed. The system allows knowledge to remain organized but readily accessible, and can greatly facilitate browsing and search. This visualization system can enable users to explore the information space without losing the contextual information between nodes and/or being restricted to a pre-designated (linear) path. In addition, relevant information can be clustered together with the distance between nodes reflective of content relevancy, which provides semantic context and relatedness to enhance understanding. Explicit visualization of contextual information can facilitate understanding and knowledge retention. It can also facilitate new knowledge discovery, in part by displaying gaps and relationships.

Figure 4C:
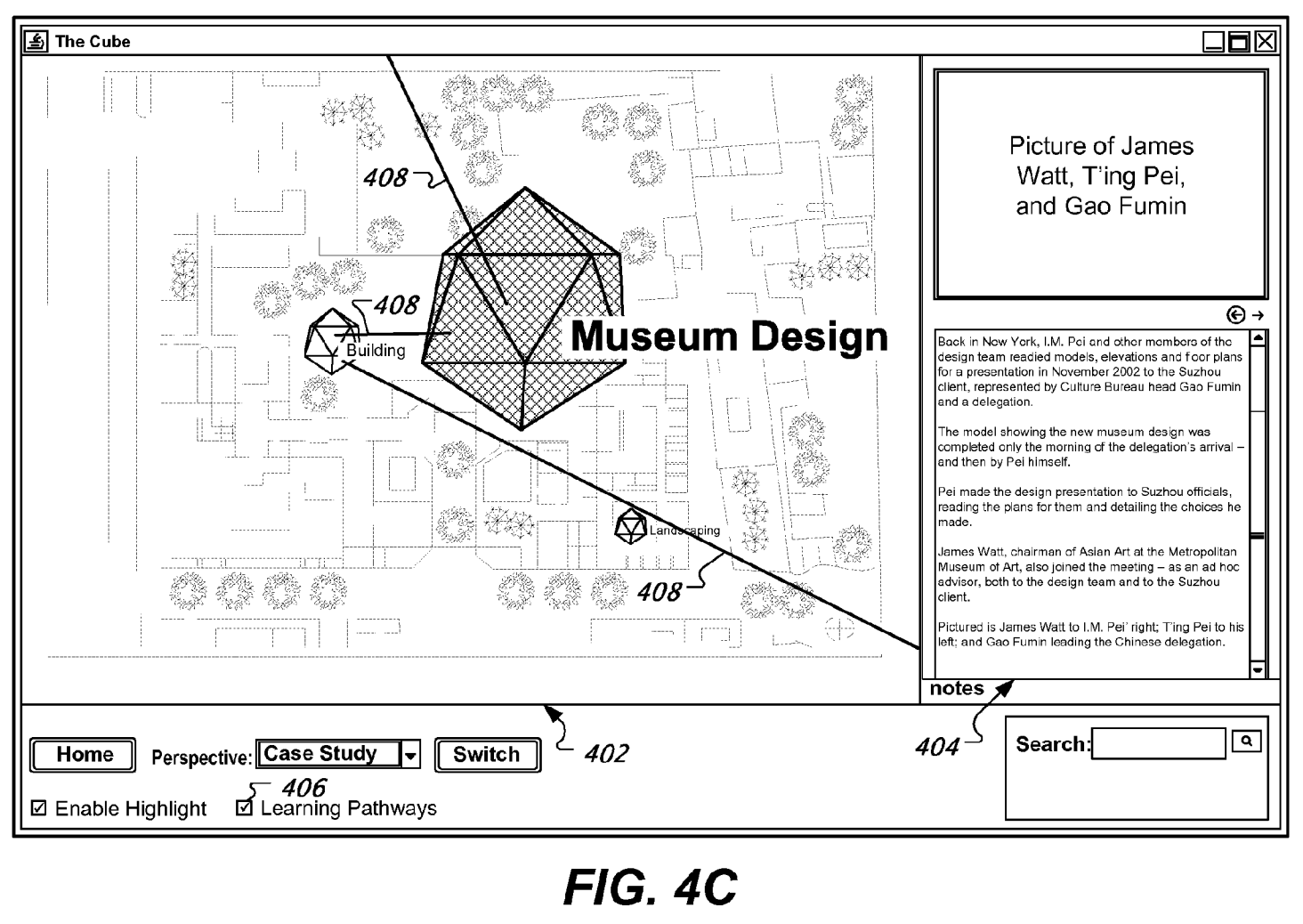

In addition, users can designate single or multiple pathways, through a given body of content, through the pathways subsystem. For example, learning pathways check-box control 406 can be selected to turn on the display of one or more specified pathways through the content. FIG. 4C shows the user interface of FIG. 4B after a user has changed the view point and selected the learning pathways check-box control 406. As shown, a learning pathway 408 is presented in the display area 402, allowing the user to follow a specified path through the information space, irrespective of the current user's perspective into the N dimensional total information space. Such pathways can be directional, or not, and can be of particular value in the context of changing perspectives, since different users may have very different views presented into the same dataset, even while engaging in the same course of study. For instance, in the example shown (where the dataset corresponds to many different aspects of a museum in China), a student majoring in architectural design for buildings can be presented with a very different overall perspective on the dataset than another student majoring in history, but can nonetheless be shown the same path (in terms of subject matter) through the dataset when taking a class about the architect I.M. Pei.

FIG. 5A shows an example process of generating a visual representation of a dataset based on a defined perspective. A definition of a perspective into a dataset can be received 502, where the dataset is associated with N separate ontologies that each specify relationships among data elements in the dataset. The perspective definition can be generated automatically by the system, can be specified by a user, or can be a combination of user-specified and system-specified perspective attributes. Thus, the perspective definitions used by the system can be pre-defined perspectives, or dynamically-generated perspectives. Dynamically-generated perspectives can be based on pre-defined perspectives, but are, in general, the way the body of content reorganizes itself according to how the evaluation system is evaluating the user's needs.

In general, each data element in the dataset can be assigned an N-dimensional location in the N-dimensional information space based on various factors, including (1) arbitrary assignments by the platform and/or the content provider, (2) a combination of arbitrary allocation and user inputs, and (3) a set of multiple ontologies compiled by domain experts for multiple knowledge domains (e.g., history, art, architecture, etc.) that are each potentially applicable to the dataset. In any event, there can be N separate ontologies that correspond to the N-dimensional information space (which can also be a proper subset of a larger information space having dimensions specified by factors other than ontologies), and the data elements can be placed in the N dimensional information space according to semantic similarity among ontology elements.

The ontologies can be linked with the dataset through an annotation set. Each data element in the dataset can be linked with the multiple ontologies through annotations that associate a given data element with ontology elements of the various ontologies. Note that each ontology can include an element used for data for which the ontology is not applicable; thus, every data element can be associated with every ontology, regardless of the respective subject matters.

Various types of ontologies can be used. These can include event-driven ontologies and concept-driven ontologies. Event-driven ontologies can be used to annotate information with attributes of typical event types, such as people, activities, time, physical locations, objects, etc. Concept-driven ontologies can be used to annotate conceptual information in terms of its meaning. Concept-driven ontologies are, in general, more qualitative in nature than event-driven ontologies. For instance, if a given knowledge domain that is being described by the annotation set focuses on medical management, event-driven ontologies can include such data as patient information, prescriptions and appointments, while concept-driven ontologies can include data about treatment analysis, after-care treatment strategies, etc. Nonetheless, while the techniques described below focus on concept-driven ontologies, it will be appreciated that they can also be applied to event-driven ontologies.

In the knowledge engineering process, domain experts can devise ontologies and annotate each piece of information with concepts in each ontology. As noted, because not every piece of information corresponds to concepts from all ontologies, each ontology can include a special "not applicable" concept. This special concept can be taken into consideration by the system when performing dimension reduction, and a data element with this particular value in a given dimension can be mapped to a target value equivalent to "not applicable". For example, this can be done using the algebraic formulation:

$$a * b = \begin{cases} a * b & \text{if } a \text{ and } b \text{ are not "Not Applicable"} \\ \text{"Not Applicable"} & \text{if } a \text{ or } b \text{ is "Not Applicable"} \end{cases}$$

where "*" represents any numeric calculation.

Each data element can then be assigned to a location $(X_1, X_2, \ldots, X_n)$ in the N-dimensional space $D_n = \{d_1, d_2, \ldots, d_n\}$. In order to derive this location, the location value $X_i$ ($i=1 \ldots n$) should be determined along each dimension. The value of any piece of information along a given axis can be determined by the concept in the ontology that corresponds to this axis. In other words, each concept node in the ontology can represent a value along the axis to which that ontology corresponds.

In order to assign a value to each concept in the ontology, two related issues should be resolved: (1) the distance measure between concepts, and (2) the total ordering of the concepts in any given ontology. A total ordering permits order comparison between any pair of concepts while the distance measure gives the absolute distance between any pair of concepts. In order to have a meaningful location representation for each information node, both the total ordering and the distance measure should be determined.

Some ontologies come with natural and intuitive total ordering and distance measures. A typical example is time. If a perspective of chronological ordering is presumed, two time points can be readily compared, the order of time points can be determined, and the length of time between two given time points can be calculated (with appropriate quantization if necessary, such as due to differences in the precision of the various stored time values). For categorical and qualitative concepts, it can be more difficult to establish commonly-agreed measures. Some ontologies can have a natural distance measure but not a readily apparent total ordering. Geographical location is one example of this, where the distance between two locations can be readily determined, but it may be difficult to determine the order of the locations.

At the other end of the spectrum, total ordering can be readily determined in some ontologies while the distance becomes the problematic value to quantify. One example is in the word information space. Using lexciographical order, it can readily be determine that the word "Confucius" is prior to the word "Zeus", but an intuitive and accurate measure of the distance between these two words is more difficult to find. In order to assign a meaningful value to each piece of information along an axis, a systematic and consistent method for determining these two properties (total ordering and distance measure) for each axis (i.e. for each ontology) can be established.

This method can include restricting each ontology to a tree structure that represents the IS-A relationship, where each parent node is a generalization of its child node(s). This contrasts with some traditional ontological hierarchies that are generally Directed Acyclic Graphs (DAGs) in which an ontological node can have more than one parent. FIG. 5C shows an example ontology structure 520. This ontology 520 consists of nine concepts representing IS-A relationships. Ontological child nodes can be interpreted as IS-A types of their parents. For instance, concept 4 ($C_4$) and concept 5 ($C_5$) each are a type of concept 2 ($C_2$). Hence, the root node represents the most general concept while the leaf nodes represent the most specific concepts.

An approach to assigning distances between concepts in the ontology 520 can be based on the number of edges between any two concepts. For instance, as there is one edge between concept 1 ($C_1$) and concept 2 ($C_2$), the distance between concept 1 ($C_1$) and concept 2 ($C_2$) can be set equal to one. Similarly, whereas there are five edges between concept 9 ($C_9$) and concept 7 ($C_7$), this distance can be set to five. This approach assumes, however, that each edge equivalently represents the same semantic distance, which is unlikely in practice. For instance, consider ($C_1$, $C_4$) and ($C_8$, $C_9$). Because $C_8$, $C_9$ are sibling nodes, they should be semantically closer, presumably, than $C_1$, $C_4$. The distances for both pairs under this first approach, however, is two.

Another approach to assigning distances between concepts in the ontology 520 can include assigning a weight to each edge. As a result, the ontology 520 can have associated weights, W, where $w_{i,j}$ denotes the weight between connecting nodes—($C_i$, $C_j$). Therefore, the distance between concept $C_x$ and $C_y$ may be represented as:

$$Dist(C_x, C_y) = \sum_{i=1}^{k-1} w(C_{n(i)}, C_{n(i+1)})$$

where there are k nodes (including $C_x$ and $C_y$) between $C_x$ and $C_y$, and n(i) represents the i-th node along the path.

The remaining question pertains to assigning values to the weights for edges in the ontology. A typical approach takes several pieces of information (such as depth, density of child nodes, etc.) into consideration. Weights are then assigned in a top-down fashion and are reduced as the process proceeds insofar as conceptual distances should decrease as concepts become increasingly specific.

Some approaches can include assigning equal weights to siblings and weights proportional to the inverse of depth to parent-child relationships. Some approaches can employ the following equations:

$$Sim(C_x, C_y) = \frac{2 * N_r}{N_x + N_y + 2 * N_r}$$

where $C_r$ is the least common super-concept between $C_x$ and $C_y$; $N_x$ is the length of path from $C_x$ to $C_r$; and $N_y$ is the length of path from $C_y$ to $C_r$. $N_r$ is the length of path from $C_r$ to the root node.

$$Dist(C_x, C_y) = 1 - Sim(C_x, C_y) = \frac{N_x + N_y}{N_x + N_y + 2 * N_r}$$

can then be used to determine the distances. Note that such approaches take only ontology structure into consideration, but this structure may not accurately reflect the semantic distances between the concepts.

One way to address this issue is to measure the semantic similarity by estimating the information content that is shared by any two concepts. According to the information theory and ontological hierarchy, this is exactly the most specific common ancestor, say C, of these two concepts, say $C_1$, $C_2$, and its information content can be measured as $-\log p(C)$ where $P(C)$ is the probability of encountering concept C in a large corpus. Other variations based on this method have been developed, but these variations can suffer from an insufficient and biased corpus on which the approaches depend, and the depth of the particular concept node is extremely important in determining the weights. Thus, a hybrid approach can be employed, where semantic similarity can be estimated on top of the ontological structure, to help in addressing these issues. Thus, both the graph-structure and semantic information can be used in the weight estimation process.

FIG. 5B shows an example process of placing data elements in an N dimensional information space. The co-relation between ontology elements of a given ontology can be estimated 512 based on a corpus that has been expanded using network documents. The corpus can include data elements associated with the ontology elements (e.g., data from the dataset that has been linked with the ontology elements through the annotation set) and documents retrieved from a computer network (e.g., the Internet) in accordance with terms retrieved from the data elements associated with the ontology elements. This can involve using publicly available Web search engines or customized proprietary search engines.

For example, informative and important terms can be extracted from existing documents using one TFxIDF (Term Frequency and Inverse Document Frequency). Other approaches to measuring the similarity between documents can be used, such as by using mutual information insofar as it measures the co-occurrence probability for words. The document set can then be expanded by querying general-purpose search engines using the extracted terms to form queries. The resulting document set can then be used to estimate the co-relation between the ontological parent node and its child nodes, which can, in turn, be used to give a weight to each edge.

Semantic distances among the data elements can be determined 514 with respect to a given ontology based on a tree structure of the given ontology and the estimates of co-relation between the ontology elements of the given ontology. For example, the distance between two concepts can be calculated by the formula used in the graph-based approach described above, using the newly assigned weights. To further illustrate this, consider the following example.

A document set ($Doc_1, Doc_2, \ldots Doc_M$) can be provided, where each document is assigned to its most specific concept in the ontology. There are K concepts in the ontology and $N(C_i)$ represents the number of documents that are assigned to concept $C_i$. The weights can be estimated in a bottom-up fashion. In reference to the sample ontology 520 shown in FIG. 5C, weights for ontological sibling nodes ($C_8, C_9$) and ($C_6, C_7$) can be estimated first. Important terms can be extracted from documents that are assigned to a particular concept, general-purpose search engines can be employed to retrieve similar articles to augment the document corpus, and the real probability distribution can be estimated. This process can be represented using the following pseudo-code:

Given a parent node $C_p$ and its child nodes $\{C_1, C_2, \ldots, C_x\}$
Return $\{w_{p_1}, w_{p_2}, \ldots, w_{px}\}$
System parameters: K, M
Algorithm estimate-weights:
1. Let $S=\{S_1, S_2, \ldots, S_x, S_p\}$ where $S_i$ denotes the documents that are assigned to concept $C_i$
2. Calculate TFxIDF values for each term in those documents and generate set $T=\{T_1, T_2, \ldots, T_x, T_p\}$, where $T_i$ denotes a set of K terms that have the highest TFxIDF values.
   For each $T_i$, issue a search engine query consisting of terms in $T_i$, retrieving the top M results. Let $R=\{R_1, R_2, \ldots, R_x, R_p\}$ where $R_i$ denotes the set of documents returned from the search engine with query terms $T_i$.
3. The co-relation (predictiveness factor) between ($C_p, C_i$) (where i=1 ... x) can be estimated as $$\text{Cover}(C_p, C_i) = \frac{|R_p \cap R_i|}{|R_p|} \approx P[C_i | C_p]$$

(conditional probability of $C_i$ given $C_p$)
4. $W=\{w_{p_1}, w_{p_2}, \ldots, w_{px}\}=\{1-\text{Cover}(C_p, C_1), 1-\text{Cover}(C_p, C_2), \ldots, 1-\text{Cover}(C_p, C_x)\}$ From this, the similarity between two concepts $C_x$ and $C_y$ can be estimated:

$$Sim(C_x, C_y) = \frac{2 * P_r}{P_x + P_y + 2 * P_r}$$

where $C_r$ is the least common super-concept between $C_x$ and $C_y$; $P_x$ is the length of path from $C_x$ to $C_r$; and $P_y$ is the length of path from $C_y$ to $C_r$. $P_r$ is the length of path from $C_r$ to the root node. Thus, $$Dist(C_x, C_y) = 1 - Sim(C_x, C_y) = \frac{P_1 + P_2}{P_1 + P_2 + 2 * P_r}$$

can be used to calculate the distance.

A total ordering for the data elements can be determined 516 with respect to the given ontology based on the determined semantic distances. Note that categorical data need not have natural ordering. Thus, ordering will often need to be super-imposed without necessary correspondence to any quantifiable meaning. At times, however, concept ordering is implicitly implied according to the semantic meanings of information nodes. Hence, semantic total ordering of categorical data can be generated according to their semantic distance, as per the following algorithm:

Input: Given an ontology root node $N_r$
Output: generate a total ordering
Algorithm: Total-Ordering (root-node $N_r$)
1. If $N_r$ is a leaf node, then return $N_r$.
2. For each child node of $N_r$ ($N_1, N_2, \ldots, N_k$), calculate their semantic distances from parent node $N_r$ and generate a sorted list of the distance ascendantly $\{(N_r, N(1)), D(N_r, N(2)), \ldots, D(N_r, N(k))\}$ where N(i) represents the child node that is i-th shortest distant from the root node.
3. for i=1 ... k
   Total-Ordering (N(i)) and put $N_r$ in the middle.

As may be seen from this algorithm, specific sibling nodes are clustered closer in the generated total ordering, and is reflective of their semantic distance.

For example, if the distances between each node and its child node(s) in the ontology 520 are determined to be as follows: $w_{1,2}=1.2$, $w_{2,4}=0.7$, $w_{2,5}=0.9$, $w_{5,8}=0.5$, $w_{5,9}=0.4$, $w_{1,3}=0.8$, $w_{3,6}=0.2$, $w_{3,7}=0.3$. Applying the above describe algorithm results in the following order: C6, C3, C7, C1, C9, C5, C8, C2, C4. Thus, the total ordering of the nodes has been defined. Note that a total ordering only gives one a way to determine which node comes before another node, without specifying the exact value that each node represents. In order to be able to represent nodes in a numeric fashion, therefore, each node can be assigned a value. One way we do this is by assigning an initial value to the root node (often zero, but not necessarily so), with values for the other node(s) calculated according to their distance to the parent node(s).

Referring again to FIG. 5A, the N dimensional information space can be reduced 504 to X dimensions based on the perspective definition, where X is greater than one and less than N. To visualize the information universe in an intuitive way on a computer screen, the N-dimensional information universe can be reduced into a 3-dimensional visualization space (or visualization spaces having a different number of dimensions) that is then rendered to a display screen. This process is called dimension reduction and can be denoted as:

$$DR(\{\beta_1, \beta_2, \ldots, \beta_N\})=\{\alpha_1, \alpha_2, \alpha_3\}$$

where $\beta_1, \beta_2, \ldots, \beta_N$ represents the axis bases for the N-dimensional vector space, and $\alpha_1, \alpha_2, \alpha_3$ are the bases for the reduced 3-dimensional vector space. Additionally, $\alpha_1=T_1(\{\beta_1, \beta_2, \ldots, \beta_N\})$, $\alpha_2=T_2(\{\beta_1, \beta_2, \ldots, \beta_N\})$, $\alpha_3=T_3(\{\beta_1, \beta_2, \ldots, \beta_N\})$. Notice that $T_1, T_2, T_3$ can be a linear or nonlinear combination of the N bases in the original space.

The dimension reduction method employed can involve projection. Projection is a process that retains the location values in specified reduction dimensions and disregards the values in all other dimensions. Hence, the dimension reduction function can be specified as:

$$\alpha_1 = T_1(\{\beta_1, \beta_2, \ldots, \beta_N\}) = \beta_1$$

$$\alpha_2 = T_2(\{\beta_1, \beta_2, \ldots, \beta_N\}) = \beta_2$$

$$\alpha_3 = T_3(\{\beta_1, \beta_2, \ldots, \beta_N\}) = \beta_3$$

where $\beta_1$, $\beta_2$, $\beta_3$ are the bases for the three retained dimensions.

As will be appreciates, the dimension reduction process is generally a lossy process. Therefore, selecting the parameters of the dimension reduction function should be made dependent on the particular purpose of the reduction. Most dimension reduction processes intend to preserve certain properties of the data in the original space. Other approaches do not employ vector space basis transformation but instead intend to preserve some data properties. The most important and commonly preserved property is that of mutual distances between data points. The primary goal is to display the data in a reduction space (e.g., a 2D, 3D, or 4D space) that theoretically corresponds to their original N-dimensional space in terms of spatial relationships.

A typical multi-dimensional scaling algorithm, which can be employed at 504, can involve the following operations:
1. For each data point in the N-dimensional space, assign its corresponding 3-dimensional space location randomly (according to a given scheme).
2. Generate 2 distance matrix $M_{k \times k}$ for the original N-dimensional space and the reduced 3-dimensional space.

$$M_{k \times k} = \begin{bmatrix} D_x(P_1, P_1) & D_x(P_1, P_2) & \ldots & D_x(P_1, P_{k-1}) & D_x(P_1, P_k) \\ D_x(P_2, P_1) & D_x(P_2, P_2) & \ldots & D_x(P_2, P_{k-1}) & D_x(P_2, P_k) \\ \vdots & \vdots & \vdots & \vdots & \vdots \\ D_x(P_{k-1}, P_1) & D_x(P_{k-1}, P_2) & \ldots & D_x(P_{k-1}, P_{k-1}) & D_x(P_{k-1}, P_k) \\ D_x(P_k, P_1) & D_x(P_k, P_2) & \ldots & D_x(P_k, P_{k-1}) & D_x(P_k, P_k) \end{bmatrix}$$

where $P_i$ represents the data point i, and $D_x(P_i, P_j)$ represents the distance between point i and point j in the x-dimensional space.
3. Calculate the stress function $$\text{stress} = \sqrt{\frac{\sum \sum (D_N(P_i, P_j) - D_3(P_i, P_j))^2}{\text{scale}}}$$

4. Find the minimal value for the stress function.
The corresponding 3-dimensional location assignment will be the result.

The aforementioned approaches have various advantages and disadvantages. Finding the optimized solution for the stress function, however, can be computationally intensive and may not suitable for interactive, dynamic environments. While basis transformation for dimension reduction can be calculated quickly, it can tend to distort the spatial relationships since the compositions of dimensions result in different scale in axes in the resulting 3-dimensional space. In addition, both approaches assume that axes in the N-dimensional space are orthogonal, which may not necessarily hold true when expert-compiled ontologies are used as dimensions.

Additionally, the present systems and techniques should be capable of providing different spatial representations according to different "perspectives"—a capability not addressed in the above stress function. Note that a perspective is an instance of combinations that define the X axes in the visualization. For instance, when viewing the same body of material, an historian may assume a different perspective than, say, a mathematician. For both, when viewing the information universe, the body of content should arrange differently (i.e. information nodes should cluster in patterns of relationship according to different criteria). In order to address the issues surrounding orthogonality, computational demand on optimization and perspective, a hybrid approach can be adopted.

Figure 5D:
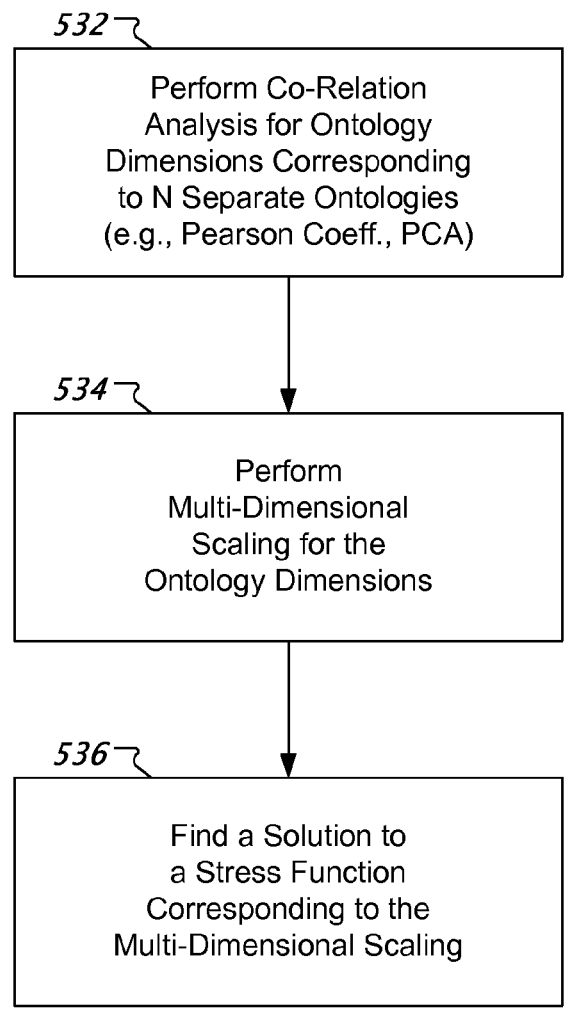
FIG. 5D shows an example process of reducing an N dimensional information space into X dimensional display space.

FIG. 5D shows an example process of reducing an N dimensional information space into X dimensional display space. Co-relation analysis can be performed 532 for ontology dimensions corresponding to the N separate ontologies. This can be done by referencing the Pearson Coefficient or by performing a principle component analysis (PCA), and such operation(s) can provide a measure of orthogonalness for the ontology dimensions. The dimensions can be organized into clusters according to their Pearson Coefficients. A PCA can be performed on dimensions within each cluster. In this manner, co-related dimensions can be transformed into orthogonal dimensions without distorting the spatial relationships among data points. This also provides the transformation functions from the original bases to orthogonal bases.

Multi-dimensional scaling can be performed 534 for the ontology dimensions in accordance with the perspective and weighted distances associated with the ontology elements of the N separate ontologies. Multi-dimensional scaling can be performed according to the weighted distance to achieve perspective, defined as an N-tuple that contains the relative weights of each orthogonal dimension, where:

$$\text{stress} = \sqrt{\frac{\sum \sum (w_i \times w_j (D_N(P_i, P_j) - D_3(P_i, P_j)))^2}{w_i \times w_j \times \text{scale}}}$$

represents a stress function corresponding to the multi-dimensional scaling.

A solution can then be found 536 for a stress function corresponding to the multi-dimensional scaling. This can involve using the Map/Reduce computation framework developed (and made available) by Google Inc., of Mountain View, Calif., as a way to perform computationally intensive algorithms over massive collections of commodity personal computers. Users of the framework need only to code their computation logics in two functions (map and reduce) and the Map/Reduce system automatically distributes and executes the jobs. Load balancing and fault tolerance are handled by the Map/Reduce system. In principle, each of the two functions are given by a (key, value) pair.

A map function performs a series of transformations over the given (key, value) pair and generates the intermediate (key, value) pairs while a reduce function takes in a (key, list of values) pair to perform some aggregate function over the given parameter. Though simple and intuitive, this framework has been used in a variety of systems and is readily applicable in this context. Note that this framework has also been augmented by others to process database queries.

In the present context, each map function can be given one of the many possible location assignments of the data point in the N-Dimensional space. The weighted stress function can be calculated and the stress value returned. In the reduce function, the minimal value of the stress function can be identified, and the corresponding location assignment can be returned. In this manner, the computational time can be reduced by a significant order of magnitude.

Referring again to FIG. 5A, once the N-dimensional information space has been reduced to the X-dimensional display space, a visual representation of the dataset can be presented 506 in the X-dimensional space. As will be appreciated, this visual representation need not include all content from the dataset. Some content can be associated with nodes that, while included in the given X-dimensional space resulting from the current perspective, are not included in the visual representation created. For example, some nodes can be not included in the current visual representation because they are child nodes of another node, which needs to be manipulated to open up the child nodes, and some nodes can be too far away (due to a current view point within the X-dimensional space) to be viewed in the visual representation created. In addition, some content from the dataset can be excluded entirely from the X-dimensional space due to the nature of the dimension reduction based on the perspective.

As noted, the X-dimensional space can be a three dimensional space. Moreover, presenting nodes in the X-dimensional space can include projecting the X dimensional space into a two dimensional display area with the nodes represented using size and brightness to represent distance from a current view point in the X dimensional space. For example, referring again to FIG. 4A, the initial 3D view shown is for the "Case Study" perspective. A drop-down menu control 410 allows the user to change this perspective as desired.

Figure 4D:
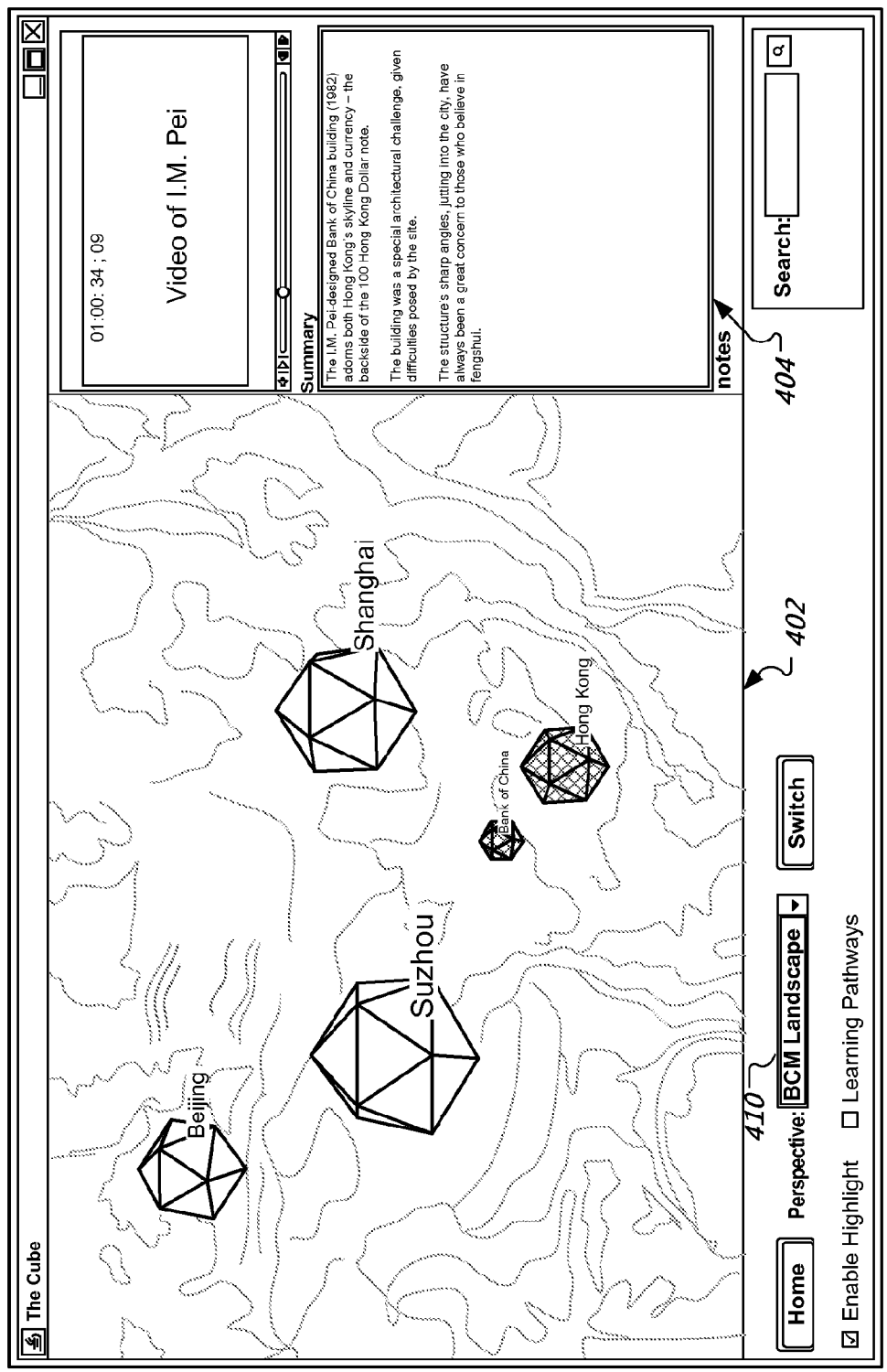
FIG. 4D shows the user interface of FIG. 4A after a user has selected the BCM Landscape perspective.
Figure 4E:
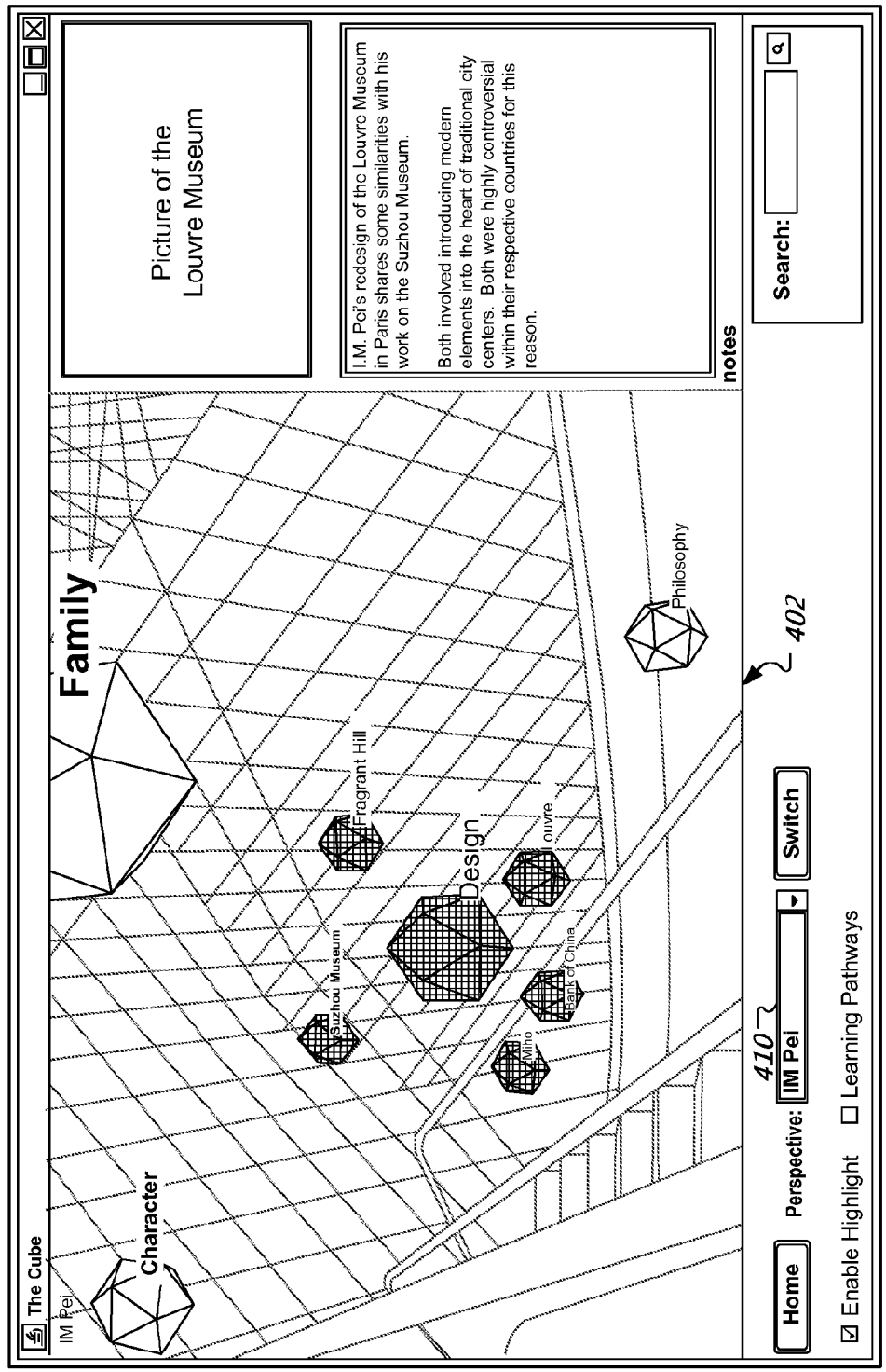
FIG. 4E shows the user interface of FIG. 4A after a user has selected the IM Pei perspective.

FIG. 4D shows the user interface of FIG. 4A after a user has selected the BCM Landscape perspective, which corresponds to a geography perspective. This change in perspective is reflected in both the drop-down menu control 410 and in the display area 402. This change in perspective allows users to access the dataset from a different perspective, and therefore positions nodes in a way that is potentially of greater interest to them. FIG. 4E shows the user interface of FIG. 4A after a user has selected the IM Pei perspective, which corresponds to a perspective defined for an individual, I.M. Pei. Once again, this change in perspective is reflect in both the drop-down menu control 410 and in the display area 402.

This perspective changing functionality can be used in a process of integrating qualitative information with quantitative data. A default perspective, embodying a given discipline, strategy, or point of view, originally defines the organization of content. Other perspectives, however, are also possible, and the same body of information can be reorganized accordingly. For instance, selecting an alternative perspective allows the entire universe of content to fundamentally reshape according to a new set of parameters. When this happens, no piece of content need disappear from the universe; rather, every node can be reorganized in relation to the other nodes. Child nodes may be become parents, and parent nodes may become children; and spatial relationships change. Every new perspective can bring about a reorganization of the content universe. This can allow users to adapt a given body of content to different disciplines and interests. Thus, this feature is one way in which qualitative ideas and quantitative information can be integrated together in a knowledge platform.

As a result, hypothesis creation and testing can be supported. Hypothesis creation is supported by allowing qualitative perspectives to shape the delivery of quantitative data. Hypothesis testing can be supported in two ways: (1) once again, by allowing theory to shape content delivery, and (2) by collecting data on those user experiences that test a given hypothesis.

In the system, perspective can be defined as an instance of combinations that define the X axes in the visualization. Perspective can be represented as an N-tuple of weights ($W_1$, $W_2$, ..., $W_N$), and can be used in the calculation of the stress function to reflect the importance of each of the orthogonal bases. The rationale for this definition can be understood as follows. A perspective puts emphases on given combinations of dimensions, ignoring other dimensions. For an historian's perspective, for example, more emphasis is likely to be placed on factors such as time, people, and culture, and less emphasis on factors like color and shape. Correspondingly, this example historian can put more weights on those factors (dimensions) that her academic discipline, for instance, or point of view emphasizes. Mathematically, the spatial relationships of data in those dimensions can be preserved while spatial relationships of data in other dimensions can be distorted or disregarded to reflect her historical view of the information universe.

A perspective can be viewed as a projection from N-dimensional space to X-dimensional space (where X is less than N). It defines the mapping from the original N axes to the target X axes. A simple but fundament projection is to retain X out of N axes in the original space. For instance, a projection that selects (A,B,C) (A, B, C are axes) will transform an N-dimensional representation ($D_1$, $D_2$, ..., $D_N$) into (0, 0, ..., $D_A$, ..., $D_B$, ..., $D_C$, ... 0). In other words, it only retains the values for dimension A, B, and C. A general definition of a perspective can be denoted as:

$$P_{N \to 3} = (F_1(DS_1), F_2(DS_2), F_3(DS_3))$$

where $P_{N \to 3}$ represents a perspective that maps information from N-dimensional space to 3-D space; $F_i$ represents the mapping functions from original N-dimensional axes to the target i-th axis; and $DS_i$ represents the axes in the original space that participate in the transformation. Note that $F_i$ can be a linear or non-linear function, and $DS_i$s need not be mutually exclusive. In the following, examples for defining a perspective (i.e. projection) are given.

Example 1

Suppose we want to look at a given set of information through an historian's perspective. Likely, an historian will view events through factors such as time, location, importance, cultural significance, etc. Hence, one possible way to define the historian's perspective is as follows:

$$PH_{N \to 3} = \left( D_{time}, \frac{1}{3}(D_{location} + D_{culture} + D_{race}), \frac{\sum \overline{DS}}{N-4} \right)$$

where $\frac{\sum \overline{DS}}{N-4}$ is the weighted sum of the remanding axes.

Example 2

Suppose we want to look at a given set of information through an educator's perspective. An educator may want to look at events through such factors as difficulty level, discipline, etc. One possible way to define the educator's perspective is as follows:

$$PE_{N \to 3}(D_{level}, D_{discipline}, D_{impact})$$

Hence, the educator perspective ignores all dimensions other than difficulty level, discipline, and impact. During the dimension reduction process, the system can determine the location of information nodes according to a particular perspective by applying the perspective mapping.

In addition, the knowledge platform can be designed to evolve with new content. This can be supported in three ways. (1) Collaborative editing, supported by a collaborative contribution subsystem and providing designated users with the opportunity to contribute such content as (a) comments for personal use or to be read by other users, (b) new content, (c) contextual information (including visually represented information) about any piece of content, and/or (d) qualitative information, perspectives, or points of view that may reshape the body of content with perspective. (2) Automatically-acquired, filtered, and classified content—new information flowing into the knowledge base can be classified according to domain-specific categories. This functionality can be supported by our the auto-classification subsystem and the semantic annotation subsystem. (3) Internally-collected data on user experiences, which allows the platform to adapt to user needs. This can be supported by a content editing or authoring subsystem(s) in two ways: (a) data collected on platform adaptation can be fed back to instructors and institutions, who in turn may adapt the system, and (b) the knowledge platform can include artificial intelligence algorithms that modify system behavior according to user experience.

The knowledge platform can also support semantic search features (as opposed to a standard syntactic search option only). Such features can be accessed through the example search box control 414 shown in FIG. 4A, or through other user interface controls. Moreover, metasearch functionalities can also be supported. For example, the advanced search subsystem can increase efficiency by reducing junk search items, and can do a better job of giving users what they want when they want it—even for users for whom the precise nature of that for which they are looking is unclear.

With respect to the adaptivity of the system, the knowledge platform can adapt to user needs by (1) reshaping content delivery, (2) reshaping content, and (3) changing the behavior of systems and subsystems. The adaptivity component can be designed to tailor content to individual or institutional user needs—for instance, interests, knowledge levels, and/or abilities. Designated users can be allowed to edit a range of media types through a content editing subsystem. Users can designate single or multiple pathways through a given content body through a pathways subsystem or leave "trails" that track the path they have traversed. In this way, the system can be made multi-linear as opposed to being simply non-linear, with instructors or other users able to direct users along the specific content path.

A directed organization subsystem can allow users to organize content at will to meet their needs. A dynamic organization subsystem, working in tandem with the evaluation subsystem, can allow the platform itself to adapt content delivery to user needs. Thus, the knowledge platform can adapt to numerous disciplines, curricula and perspectives, as well as individual user needs (including knowledge and skill levels), can support and display individual instructor or manager needs to convey his or her strategy and/or approach to content, and can accommodate multiple end-users with a variety of objectives.

The knowledge platform can include embedded evaluation that provides feedback at multiple levels, including at the level of the platform itself, where evaluation provides information for the system to adapt to user needs, and at the level of learners and intructors, where evaluation is useful in determining if true understanding is occurring. Thus, the system feedback can include feedback that influences platform behavior and delivery of content, and tailored feedback to learners and educators to determine effectiveness.

Figure 6A:
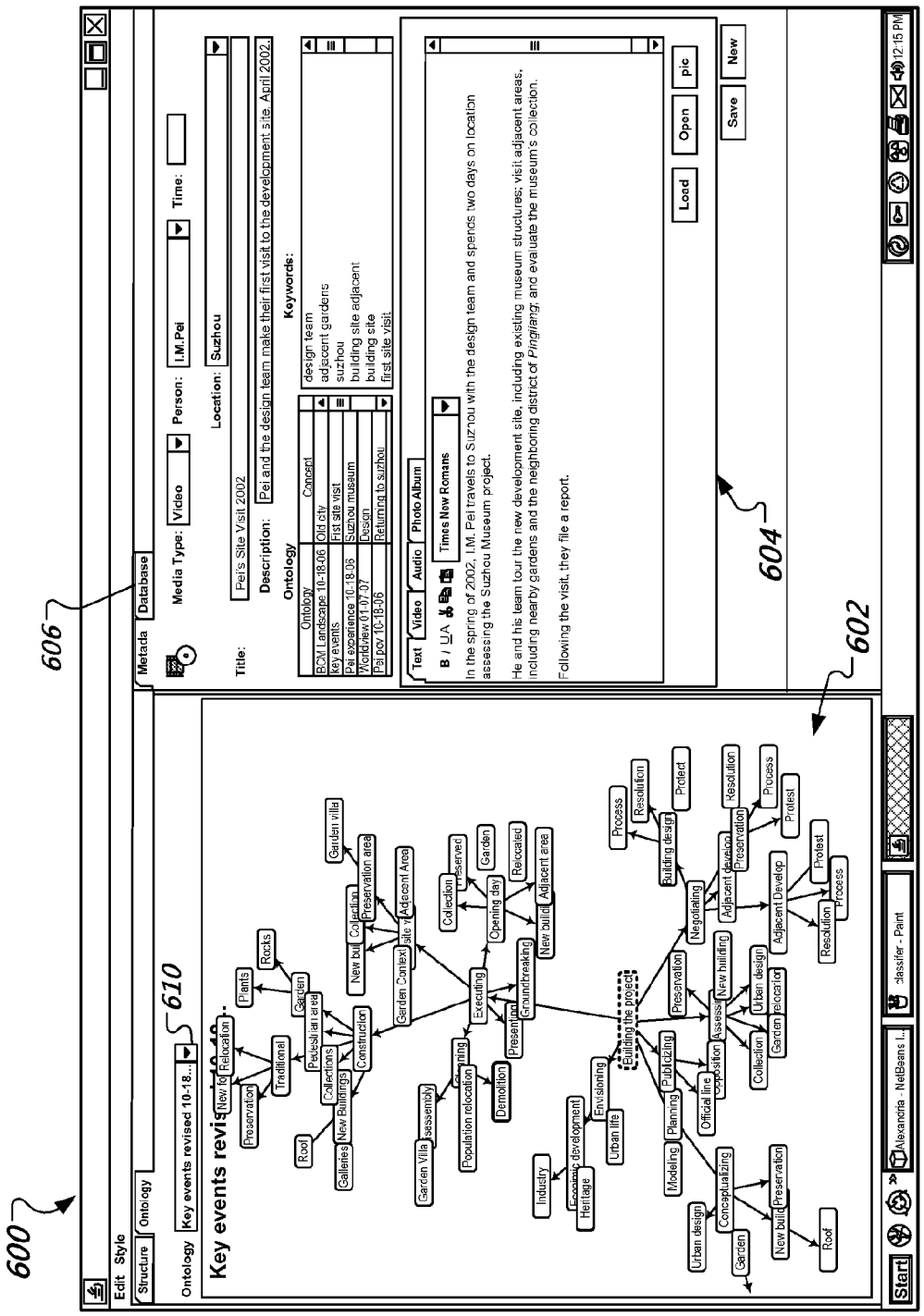
FIG. 6A shows an example user interface for a knowledge factory provided by a semantic annotation subsystem.

Moreover, the semantic annotation subsystem can provide a way to facilitate the input of new information by providing a tool for semantic annotation. FIG. 6A shows an example user interface 600 for a knowledge factory provided by a semantic annotation subsystem. The knowledge factory of the semantic annotation subsystem can display the content being annotated, as well as a range of annotation possibilities, on one screen. An ontology can be shown in a first display area 602, and users can drag and drop a particular concept to a second display area 604 to annotate the current information with that particular concept. In addition, a database of previously annotated information can be readily accessed on a separate screen, such as through a tab control 606.

Figure 6B:
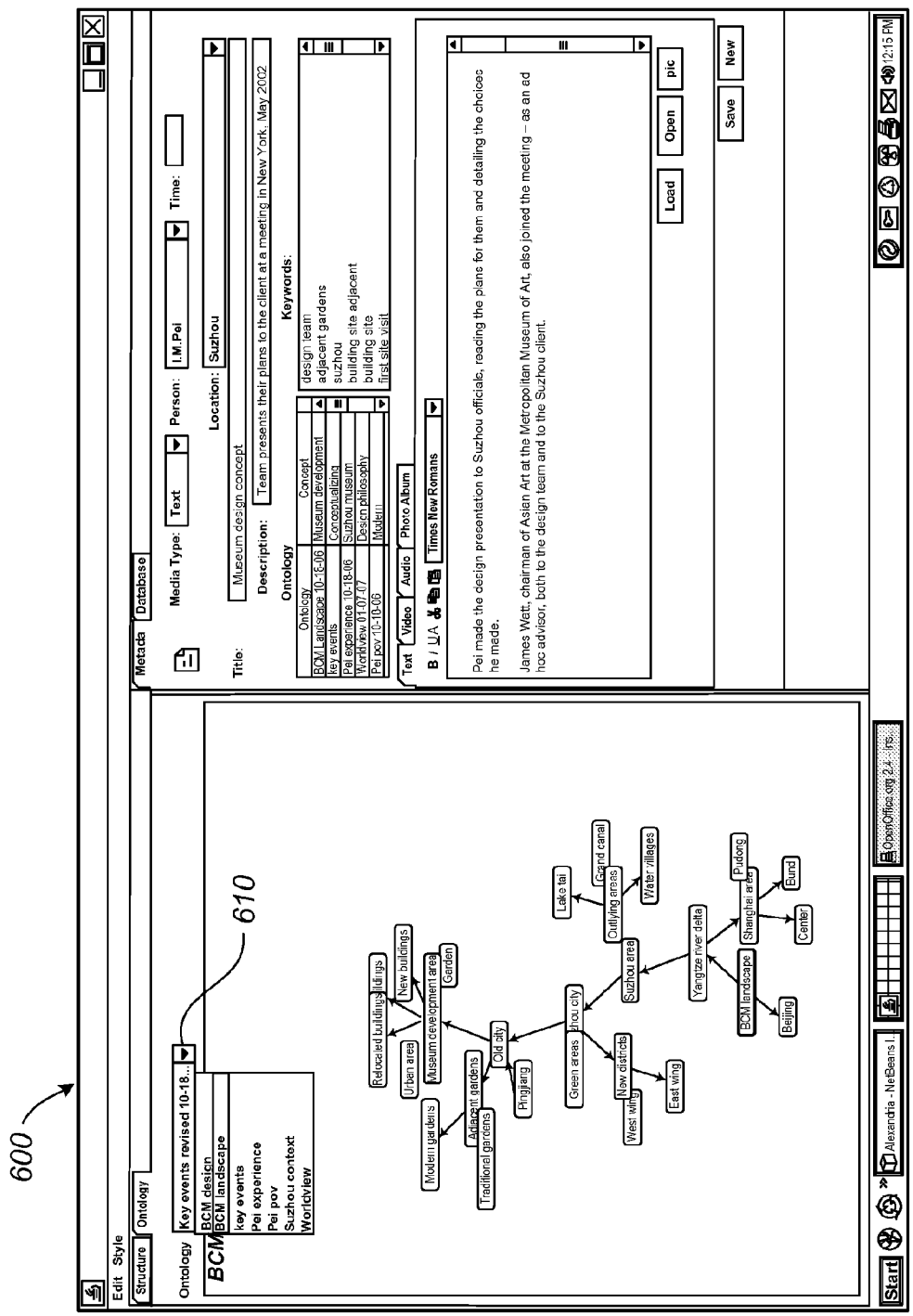
FIG. 6B shows the example user interface of FIG. 6A with an ontology selection control 610 having been selected.
Figure 6C:
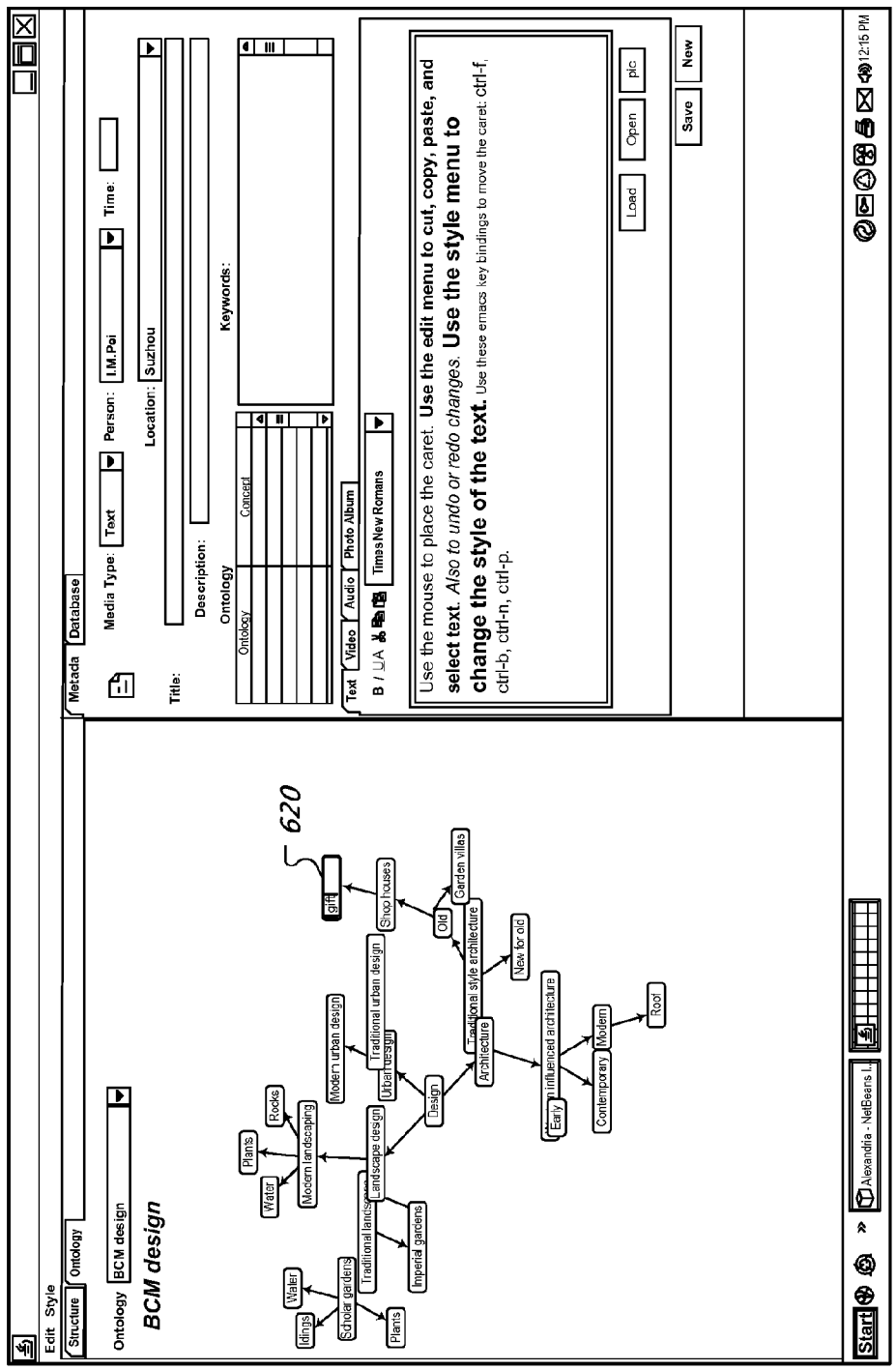
FIG. 6C shows the example user interface of FIG. 6A with in-place editing being performed on an ontology structure.

This knowledge factory tool of the semantic annotation subsystem can support annotation of a full range of multimedia content; can provide tools for an integrated approach to category annotation (media type; key words, etc.) and concept annotation (using an annotation set); and can provide an integrated display of content and a range of annotation tools for accurate and efficient contextual annotation. In addition, the knowledge factory can provide flexible and effective visualization for multiple ontologies. For instance, FIG. 6B shows the example user interface 600 of FIG. 6A with an ontology selection control 610 having been selected. Furthermore, the user interface 600 can support direct modification of the ontology shown in the knowledge factory. For instance, FIG. 6C shows the example user interface 600 of FIG. 6A with in-place editing 620 being performed on an ontology structure.

The knowledge factory can allow a given body of content to be annotated according to quantitative information (e.g., for a given event, then date, person, place, time, key words, descriptive text and title, as well as content type), which can be selected from a combination of menus and/or manually entered, and relational or qualitative information (represented by ontologies that embody principles of discrimination and/or of relationships inherent in disciplines, points of view, hypotheses, organizational patterns, etc.). Multiple ontologies can be created for a given dataset. These can be created by the system designer or they can be user-created. They can also be augmented over time through the feedback mechanisms provided in the system. Users can manually associate corresponding nodes within one or more ontological hierarchies with the content to be annotated, or this process can be automated.

In addition, as noted above, a knowledge aggregator can be employed by the system to keep pace with the growth of new data. The knowledge aggregator can automatically collect, filter and organize new content, with the ability to target a wide variety of source material—from the Web (such as designated high-value sources), private databases, and private computer files. The system can filter and classify information according to semantic meaning. The knowledge aggregator can use the semantic annotation subsystem and the auto-classification subsystem, both of which can be tied to the knowledge management system—and all of which can be used to support the knowledge platform's functionality.

Figure 7A:
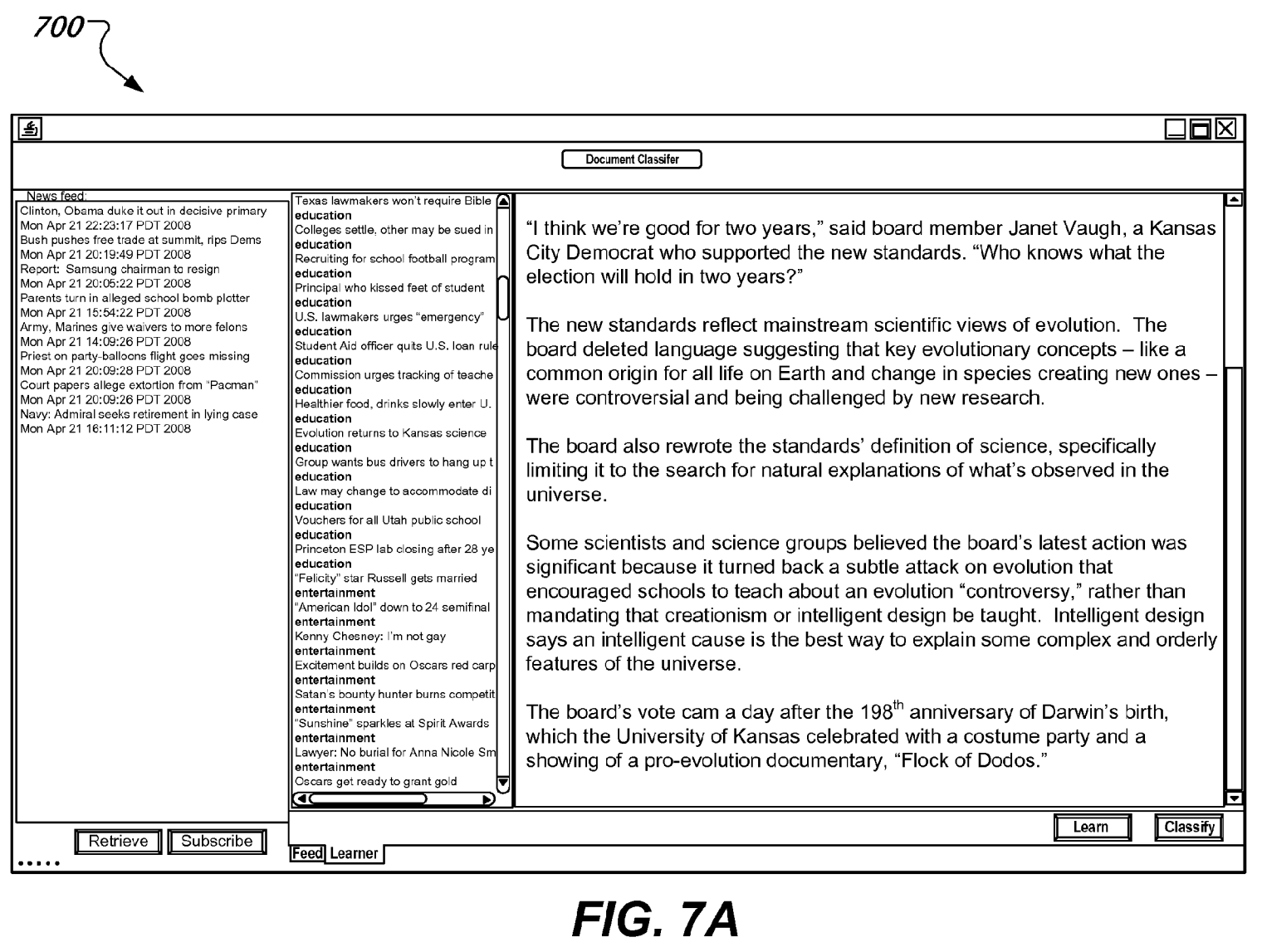
Figure 7B:
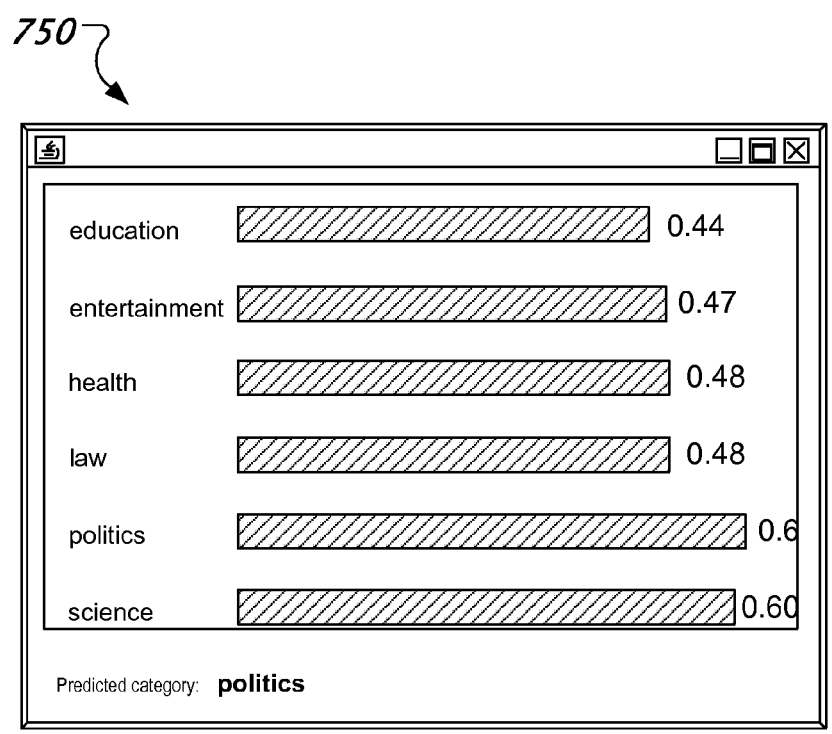
FIG. 7B shows an example dialog that presents a set of example categories for a new document and the predicted category.

The knowledge platform can automatically import information from remote sources, such as news feed, blogs, private databases, etc. The knowledge platform can learn from existing documents and their categories in order to predict the category of new documents. FIG. 7A shows an example user interface 700 for use in monitoring and controlling this knowledge growth and classification process. Moreover, the knowledge platform can predict the category for a new document through the ranking of the likelihood scores. FIG. 7B shows an example dialog 750 that presents a set of example categories (education, entertainment, health, law, politics, science) for a new document and the predicted category (politics).

For automatic importing of data, the system can provide subscription mechanisms for users to specify data sources. Data sources include, but are not limited to, search results from Internet search engines, news and RSS feeds such as news websites and blogs, online public/private library catalogs, publications and papers, proprietary databases, incoming emails, monitored file changes in specified file directories, etc. Newly available data from specified data sources can be imported into the system with appropriate meta-data (such as data sources, date, content types, etc.) annotated and sent to the auto-classification subsystem.

For auto-classification, the system can use the initially annotated dataset as the training data, extracting relationships between features and data categories (i.e., ontology annotations in the system). Two major tasks can be done in the classification process: (1) the system can determine if the newly imported data is relevant or not; and (2) the system can categorize the "relevant" data. Once those data are annotated automatically, the system can present the categorized results to the content administrator(s). The content administrator(s) can mark data as mis-categorized, if necessary, and the auto-classification system can use these as negative training data to re-adjust the parameters in the learning model to improve accuracy. At this point, the content administrator(s) can decide to populate the data to the knowledge database. Several possible approaches can be used in the learning process. For example, an ensemble approach can be taken by combining the weighted categorization results from multiple classifiers. In particular, the Ada-boost algorithm can be used to re-adjust the weighting scheme.

The classifiers can be implemented as individual modules. Modules can be replaced, removed, or added. The content administrator(s) can decide which classifier modules to use, add, or remove. Once the set of classifier modules being used are changed, the weights for each classifier can be re-adjust. Here is an example approach: Suppose we have N classifiers initially and each has weight $X_i$ (i=1 . . . N). We know, $$\sum_{i=1}^{N} X_i = 1.$$

Now, suppose we add a new classifier, its weight $X_{N+1}$ is $$\min_{i=1 \ldots N} X_i,$$

and the new weight for $X_1' L\ X_N'$ is determined by: $X_i'=X_i(1-X_{N+1})$. If we remove a classifier module, say $X_k$, then the new weight for $X_1' L\ X_{k-1}' X_{k+1}' L\ X_N'$ is determined by:

$$X_i' = X_i \left( \sum_{j=1 \ldots N, j \neq k} X_j \right).$$

If we replace a classifier with another one, the new classifier can carry the same weight as the replaced one. We now have classifiers—Bayesian network, Naïve Bayes, K-nearest neighbors (KNN), Support Vector Machine (SVM), Fisher's linear discriminant, Neural Network. New classifier modules can also be implemented and added in the future.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a Global Positioning System (GPS) receiver, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, implementations of described subsystems can be fully integrated with other described subsystems, or they can operate as modular, stand-alone implementations. Alternative visualization approaches can be employed, such as by displaying data without hierarchical clustering. Users can discern the potential hierarchical relationships among nodes through the distribution density of the groups of nodes.

The invention can be assembled in the broadest possible combination of systems and components as dictated by the commissioning users. For example, the invention can be used for multi-perspective and non-linear (or multi-linear) content display and visualization, without the features provided by the adaptivity component; semantic annotation, content acquisition, and/or classification subsystem(s); search subsystem; evaluation subsystem; or learning pathway subsystem. Alternatively, it can be used as above but in combination with any one or more than one of these features.

The invention can be built by emphasizing the highest degree of machine learning technology, or by relying solely on manual inputs, or by any number of combinations of approaches. For instance, the placement of nodes within the information universe and/or within a given perspective can be determined through machine learning as described herein, or it can be manually determined, or through a combination of manual and machine learning. Similarly, the knowledge factory can be used to automatically annotate information, or it can be used solely for manual annotation, or for a combination of automatic and manual annotation. Growth features can be included that allow the automatic acquisition, filtering, and classification of new information and/or they can involve direct user input at one level or another. Evaluation and adaptive features can be automatic and/or either or both can include manual operations. Search features can be limited to the dataset and/or may involve a larger volume of data including all data on the Web.

The invention can be used in any one of the ways or combination of ways described herein, or with any one feature emphasized to the exclusion or near-exclusion of other uses. For instance, it may be used largely for the purpose of collecting user data, with other uses minimized or ignored. Further, it may be used to manage information streaming in from other systems, rather than act as a primary management system. These are just two examples, and other applications are also possible.

What is claimed is:

1. A system comprising:
a knowledge management component to acquire, classify and disseminate information of a dataset;
a human-computer interaction component to visualize multiple perspectives of the dataset and to model user interactions with the multiple perspectives; and
an adaptivity component to modify one or more of the multiple perspectives of the dataset based on a user-interaction model;
wherein the human-computer interaction component comprises at least one hardware processor and memory configured to: (I) place data elements from a dataset, associated with separate ontologies, into an N dimensional information space based on ontological structure and semantic similarity among ontology elements, and (II) reduce the N dimensional information space based on a received perspective definition for visualization;
wherein the placement of the data elements comprises, for a given ontology of the separate ontologies and a given parent node $C_p$ in the given ontology with child nodes $\{C_1, C_2, \ldots, C_x\}$, and letting $S=\{S_1, S_2, \ldots, S_x, S_p\}$ where $S_i$ denotes documents that are assigned to concept $C_i$: (I) calculate term importance values for each term in the documents S to generate a set $T=\{T_1, T_2, \ldots, T_x, T_p\}$ where $T_i$ denotes a set of K terms that have highest term importance values, (II) issue search queries to retrieve results $R=\{R_1, R_2, \ldots, R_x, R_p\}$ where $R_i$ denotes documents returned from the search query with terms $T_i$, (III) estimate co-relation between $(C_p, C_i)$, where $i=1 \ldots x$, according to Cover($C_p$, $C_i$)=|$R_p \cap R_i$|/|$R_p$|≈P[$C_i|C_p$]], where Cover is the conditional probability of $C_i$ given $C_p$, and (IV) calculate distance between two concepts $C_x$ and $C_y$ based on Sim($C_x$, $C_y$)=2*P/$P_x$+$P_y$+2*$P_r$, where $C_r$ is the least common super-concept between $C_x$ and $C_y$, $P_x$ is the length of path from $C_x$ to $C_r$, $P_y$ is the length of path from $C_y$ to $C_r$, and $P_r$ is the length of path from $C_r$ to the root node; and wherein the reduction of the N dimensional information space comprises projecting into a three dimensional vector space, having bases $\alpha_1$, $\alpha_2$, $\alpha_3$, in accordance with $\alpha_1=T_1(\{\beta_1, \beta_2, \ldots, \beta_N\})=\beta_1$, $\alpha_2=T_2(\{\beta_1, \beta_2, \ldots, \beta_N\})=\beta_2$, and $\alpha_3=T_3(\{\beta_1, \beta_2, \ldots, \beta_N\})=\beta_3$, where $T_1$, $T_2$, $T_3$ are each a linear or nonlinear combination of the N bases in the N dimensional information space, and $\beta_1$, $\beta_2$, $\beta_3$ are bases for the three retained dimensions.

2. The system of claim 1, wherein the knowledge management component, the human-computer interaction component and the adaptivity component comprise multiple codependent subsystems that are linked together in a mutually integrative feedback loop, and wherein K is an adjustable system parameter.

3. The system of claim 2, wherein the adaptivity component comprises:
a directed organization subsystem to support user-specified content organization;
a dynamic organization subsystem to support automatic content adaptation to a given user; and
an evaluation subsystem to assess performance of both users and the system and provide feedback to the system for modification.

4. The system of claim 3, wherein the knowledge management component comprises:
a semantic annotation subsystem to capture semantic meaning of, and contextual relationships between, multiple pieces of the information;
a content acquisition subsystem to automatically retrieve new information for the dataset in accordance with one or more specified criteria; and
a classification subsystem to automatically categorize the new information in the dataset using, at least in part, the semantic annotation subsystem.

5. The system of claim 4, wherein the human-computer interaction component comprises:
one or more visualization subsystems to reorganize and present the information of the dataset, and to facilitate user-defined connections among the information; and
a search subsystem to perform semantic-context based text searches.

6. A computer-implemented method comprising:
receiving, at one or more computers comprising at least one processor and at least one memory, a definition of a perspective into a dataset associated with N separate ontologies that each specify relationships among data elements in the dataset, wherein N is greater than two, the N separate ontologies correspond to an N dimensional information space, and the data elements are placed in the N dimensional information space according to semantic similarity among ontology elements, wherein the number N of dimensions in the information space matches up with the number N of the separate ontologies;
reducing, at the one or more computers, the N dimensional information space to X dimensions based on the perspective definition, wherein X is greater than one and less than the perspective comprises a projection from the N-dimensional space to the X-dimensional space, and the perspective definition defines a mapping from original N axes to target X axes, the perspective definition being denotable as $P_{N \to 3}=(F_1(DS_1), F_2(DS_2), F_3(DS_3))$, where $P_{N \to 3}$ represents a perspective that maps information from N-dimensional space to 3-D space, $F_i$ represents mapping functions from original N-dimensional axes to a target i-th axis, and $DS_i$ represents original axes that participate in a transformation; and
presenting a visual representation of the dataset in the X dimensional space.

7. The method of claim 6, wherein X is three, and presenting the visual representation comprises presenting nodes, which correspond to at least some of the data elements, in the three dimensional space.

8. The method of claim 7, wherein presenting the nodes in the three dimensional space comprises projecting the three dimensional space into a two dimensional display area with the nodes presented using size and brightness to represent distance from a current view point in the three dimensional space.

9. The method of claim 6, wherein the data elements are placed in the N dimensional information space by a process comprising determining distances among the data elements with respect to a given ontology based on a tree structure of the given ontology and estimates of co-relation between the ontology elements of the given ontology, wherein the estimates are based on a corpus including data elements associated with the ontology elements and documents retrieved from a computer network in accordance with terms retrieved from the data elements associated with the ontology elements.

10. The method of claim 6, wherein reducing the N dimensional information space comprises:
performing co-relation analysis for ontology dimensions corresponding to the N separate ontologies;
performing multi-dimensional scaling for the ontology dimensions in accordance with the perspective and weighted distances associated with the ontology elements of the N separate ontologies; and
finding a solution to a stress function corresponding to the multi-dimensional scaling.

11. The method of claim 10, wherein performing the co-relation analysis comprises organizing the ontology dimensions into clusters according to their Pearson Coefficients.

12. The method of claim 10, wherein performing the co-relation analysis comprises performing a principal component analysis (PCA).

13. The method of claim 6, wherein each of the N separate ontologies includes an element used for data for which the ontology is not applicable.

14. A non-transitory computer-readable medium encoding a computer program product configured to cause data processing apparatus to perform operations comprising:
receiving a definition of a perspective into a dataset associated with N separate ontologies that each specify relationships among data elements in the dataset, wherein N is greater than two, the N separate ontologies correspond to an N dimensional information space, and the data elements are placed in the N dimensional information space according to semantic similarity among ontology elements, wherein the number N of dimensions in the information space matches up with the number N of the separate ontologies;
reducing the N dimensional information space to X dimensions based on the perspective definition, wherein X is greater than one and less than N, the perspective comprises a projection from the N-dimensional space to the X-dimensional space, and the perspective definition defines a mapping from original N axes to target X axes, the perspective definition being denotable as $P_{N \to 3} = (F_1(DS_1), F_2(DS_2), F_3(DS_3))$ where $P_{N \to 3}$ represents a perspective that maps information from N-dimensional space to 3-D space, $F_i$ represents mapping functions from original N-dimensional axes to a target i-th axis, and $DS_i$ represents original axes that participate in a transformation; and presenting a visual representation of the dataset in the X dimensional space.

15. The computer-readable medium of claim 14, wherein X is three, and presenting the visual representation comprises presenting nodes, which correspond to at least some of the data elements, in the three dimensional space.

16. The computer-readable medium of claim 14, wherein the data elements are placed in the N dimensional information space by a process comprising determining distances among the data elements with respect to a given ontology based on a tree structure of the given ontology and estimates of co-relation between the ontology elements of the given ontology, wherein the estimates are based on a corpus including data elements associated with the ontology elements and documents retrieved from a computer network in accordance with terms retrieved from the data elements associated with the ontology elements.

17. The computer-readable medium of claim 14, wherein reducing the N dimensional information space comprises:
performing co-relation analysis for ontology dimensions corresponding to the N separate ontologies;
performing multi-dimensional scaling for the ontology dimensions in accordance with the perspective and weighted distances associated with the ontology elements of the N separate ontologies; and
finding a solution to a stress function corresponding to the multi-dimensional scaling.

18. A system comprising:
a user interface device; and
one or more computers comprising at least one processor and at least one memory configured to interact with the user interface device and to perform operations comprising:
receiving a definition of a perspective into a dataset associated with N separate ontologies that each specify relationships among data elements in the dataset, wherein N is greater than two, the N separate ontologies correspond to an N dimensional information space, and the data elements are placed in the N dimensional information space according to semantic similarity among ontology elements, wherein the number N of dimensions in the information space matches up with the number N of the separate ontologies;
reducing the N dimensional information space to X dimensions based on the perspective definition, wherein X is greater than one and less than N, the perspective comprises a projection from the N-dimensional space to the X-dimensional space, and the perspective definition defines a mapping from original N axes to target X axes, the perspective definition being denotable as $P_{N \to 3} = (F_1(DS_1), F_2(DS_2), F_3(DS_3))$, where $P_{N \to 3}$ represents a perspective that maps information from N-dimensional space to 3-D space, $F_i$ represents mapping functions from original N-dimensional axes to a target i-th axis, and $DS_i$ represents original axes that participate in a transformation; and
presenting a visual representation of the dataset in the X dimensional space.

19. The system of claim 18, wherein the one or more computers comprise a server configured to interact with the user interface device through a data communication network, and the user interface device comprises an access device configured to interact with the server as a client.

20. The system of claim 18, wherein the one or more computers comprises one computer, and the one computer comprises the user interface device.

* * * * *

UNITED STATES PATENT AND TRADEMARK OFFICE
CERTIFICATE OF CORRECTION

PATENT NO. : 8,949,233 B2
APPLICATION NO. : 12/989756
DATED : February 3, 2015
INVENTOR(S) : Ruey-Lung Hsiao and Eugene B. Shirley, Jr.

It is certified that error appears in the above-identified patent and that said Letters Patent is hereby corrected as shown below:

In the Specification

Column 1, Line 2, below "Adaptive Knowledge Platform", insert:
-- This application is the U.S. national stage under 35 USC § 371 of International Application Number PCT/US2009/041909, filed on April 28, 2009, which claims priority to U.S. Application No. 61/048,501, filed on April 28, 2008, the entire contents of which applications are hereby incorporated by reference. --

In the Claims

Column 29, line 1, in Claim 1, delete "$|R_p \cap R_i| \| R_p |$" and insert -- $\dfrac{|R_p \cap R_i|}{|R_p|}$ -- therefor.

Column 29, line 66, in Claim 6, delete "less than" and insert -- less than N, -- therefor.

Column 31, line 4, in Claim 14, delete "$F_3(DS_3)$) where" and insert -- $F_3(DS_3)$), where -- therefor.

Signed and Sealed this
Twenty-ninth Day of September, 2015

Michelle K. Lee
*Director of the United States Patent and Trademark Office*